US012351673B2

(12) United States Patent
White et al.

(10) Patent No.: US 12,351,673 B2
(45) Date of Patent: Jul. 8, 2025

(54) TWO-PART COMPOSITIONS INCLUDING A URETDIONE-CONTAINING MATERIAL AND INORGANIC FILLER, PRODUCTS, AND METHODS

(71) Applicant: 3M INNOVATIVE PROPERTIES COMPANY, St. Paul, MN (US)

(72) Inventors: Kolby L. White, Woodbury, MN (US); Li Yao, Woodbury, MN (US); Joseph D. Rule, Woodbury, MN (US); Matthew J. Kryger, Hudson, WI (US); Michael A. Kropp, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 640 days.

(21) Appl. No.: 17/770,366

(22) PCT Filed: Dec. 10, 2020

(86) PCT No.: PCT/IB2020/061764
§ 371 (c)(1),
(2) Date: Apr. 20, 2022

(87) PCT Pub. No.: WO2021/124033
PCT Pub. Date: Jun. 24, 2021

(65) Prior Publication Data
US 2022/0396658 A1 Dec. 15, 2022

Related U.S. Application Data

(60) Provisional application No. 62/950,219, filed on Dec. 19, 2019.

(51) Int. Cl.
| | |
|---|---|
| C08G 18/12 | (2006.01) |
| C08G 18/22 | (2006.01) |
| C08G 18/32 | (2006.01) |
| C08G 18/38 | (2006.01) |
| C08G 18/48 | (2006.01) |
| C08G 18/79 | (2006.01) |
| C08K 3/22 | (2006.01) |
| C09J 175/08 | (2006.01) |

(52) U.S. Cl.
CPC ........... *C08G 18/12* (2013.01); *C08G 18/227* (2013.01); *C08G 18/3206* (2013.01); *C08G 18/3876* (2013.01); *C08G 18/4804* (2013.01); *C08G 18/4825* (2013.01); *C08G 18/4854* (2013.01); *C08G 18/798* (2013.01); *C08K 3/22* (2013.01); *C09J 175/08* (2013.01); *C08K 2003/2227* (2013.01); *C08K 2201/001* (2013.01); *C09J 2203/326* (2013.01); *C09J 2203/33* (2013.01); *Y10T 428/2896* (2015.01)

(58) Field of Classification Search
None
See application file for complete search history.

(56) References Cited

U.S. PATENT DOCUMENTS

| | | | |
|---|---|---|---|
| 3,496,250 A | 2/1970 | Czerwinski | |
| 4,609,762 A | 9/1986 | Morris et al. | |
| 5,225,472 A | 7/1993 | Cameron et al. | |
| 5,912,319 A | 6/1999 | Zook et al. | |
| 5,959,071 A | 9/1999 | DeMoss et al. | |
| 6,509,418 B1 | 1/2003 | Zook et al. | |
| 7,229,683 B2 * | 6/2007 | Fischer | C09J 7/35 428/297.4 |
| 7,744,991 B2 | 6/2010 | Fischer et al. | |
| 8,362,300 B2 | 1/2013 | Pritschins et al. | |
| 8,829,146 B2 | 9/2014 | Spyrou | |
| 9,080,074 B2 | 7/2015 | Shaffer et al. | |

(Continued)

FOREIGN PATENT DOCUMENTS

| | | |
|---|---|---|
| JP | 2000319348 A | 11/2000 |
| JP | 2005325356 A | 11/2005 |

(Continued)

OTHER PUBLICATIONS

International Search Report for PCT Application No. PCT/IB2020/061764 mailed on Mar. 18, 2021, 5 pages.
International Search Report for PCT Application No. PCT/IB2020/061899 mailed on Feb. 16, 2021, 3 pages.
Raw Materials for Automotive Refinish Systems, Bayer Material Science, 24 pages.
Wallace, "Polymers and Polyfunctionality", Transactions of the Faraday Society, 1936, vol. 32, pp. 39-49.

*Primary Examiner* — Anish P Desai
(74) *Attorney, Agent, or Firm* — Adrian L. Pishko

(57) ABSTRACT

The present disclosure provides a two-part composition polymeric material including a first part and a second part. The first part includes an inorganic filler and a polymeric material including a polymerized reaction product of a polymerizable composition including components. The components include a uretdione-containing material including a reaction product of a diisocyanate reacted with itself; a first hydroxyl-containing compound; and an optional second hydroxyl-containing compound having a single OH group. The second part includes a polythiol having an average sulfhydryl group functionality of 2 or greater. Further, a method of adhering two substrates is provided, including obtaining a two-part composition; combining at least a portion of the first part with at least a portion of the second part to form a mixture; disposing at least a portion of the mixture on a first substrate; and contacting a second substrate with the mixture disposed on the first substrate. The disclosure also provides a polymerized product of the two-part composition and a battery module. Advantageously, two-part compositions can be used as coatings and adhesive systems including high loadings of inorganic filler, such as thermally conductive filler, with handling and performance similar to existing two-part urethane systems, but with less sensitivity to water.

17 Claims, 4 Drawing Sheets

(56) References Cited

U.S. PATENT DOCUMENTS

| | | |
|---|---|---|
| 9,102,785 B2 | 8/2015 | Martz et al. |
| 2010/0152404 A1 | 6/2010 | Flosbach et al. |
| 2016/0271866 A1 | 9/2016 | Niemeyer et al. |
| 2019/0292299 A1* | 9/2019 | Dörr .................... C08G 18/168 |
| 2020/0283565 A1 | 9/2020 | Cho et al. |

FOREIGN PATENT DOCUMENTS

| | | |
|---|---|---|
| JP | 2006321822 A | 11/2006 |
| JP | 2015036385 A | 2/2015 |
| KR | 20190113582 A | 10/2019 |
| WO | 1991015550 A1 | 10/1991 |
| WO | 2016130673 A1 | 8/2016 |
| WO | 2018134721 A1 | 7/2018 |
| WO | 2019048956 A1 | 3/2019 |
| WO | 2019051222 A1 | 3/2019 |
| WO | 2019070819 A1 | 4/2019 |
| WO | 2019155327 A2 | 8/2019 |
| WO | 2019175709 A1 | 9/2019 |
| WO | 2019175714 A1 | 9/2019 |
| WO | 2020065438 A1 | 4/2020 |
| WO | 2020065456 A1 | 4/2020 |
| WO | 2020065466 A1 | 4/2020 |
| WO | 2020121116 A1 | 6/2020 |
| WO | 2020121124 A1 | 6/2020 |
| WO | 2020191579 A1 | 10/2020 |
| WO | 2021038347 A1 | 3/2021 |
| WO | 2021074734 A1 | 4/2021 |
| WO | 2021124075 A1 | 6/2021 |

\* cited by examiner

TWO-PART COMPOSITIONS INCLUDING A URETDIONE-CONTAINING MATERIAL AND INORGANIC FILLER, PRODUCTS, AND METHODS

BACKGROUND

Two-part urethane adhesives and sealants are commercially available from a variety of companies. These systems typically involve one component that is an oligomer/polymer terminated with isocyanate groups and a second component that is a polyol. When mixed, the isocyanate reacts with polyol to form carbamate groups. While this is established and effective chemistry, it suffers from a sensitivity to moisture due to ability of the isocyanate to be deactivated when reacted with water. Hence, there remains a need for adhesives and sealants that advantageously have less sensitivity to water.

Figure 1:
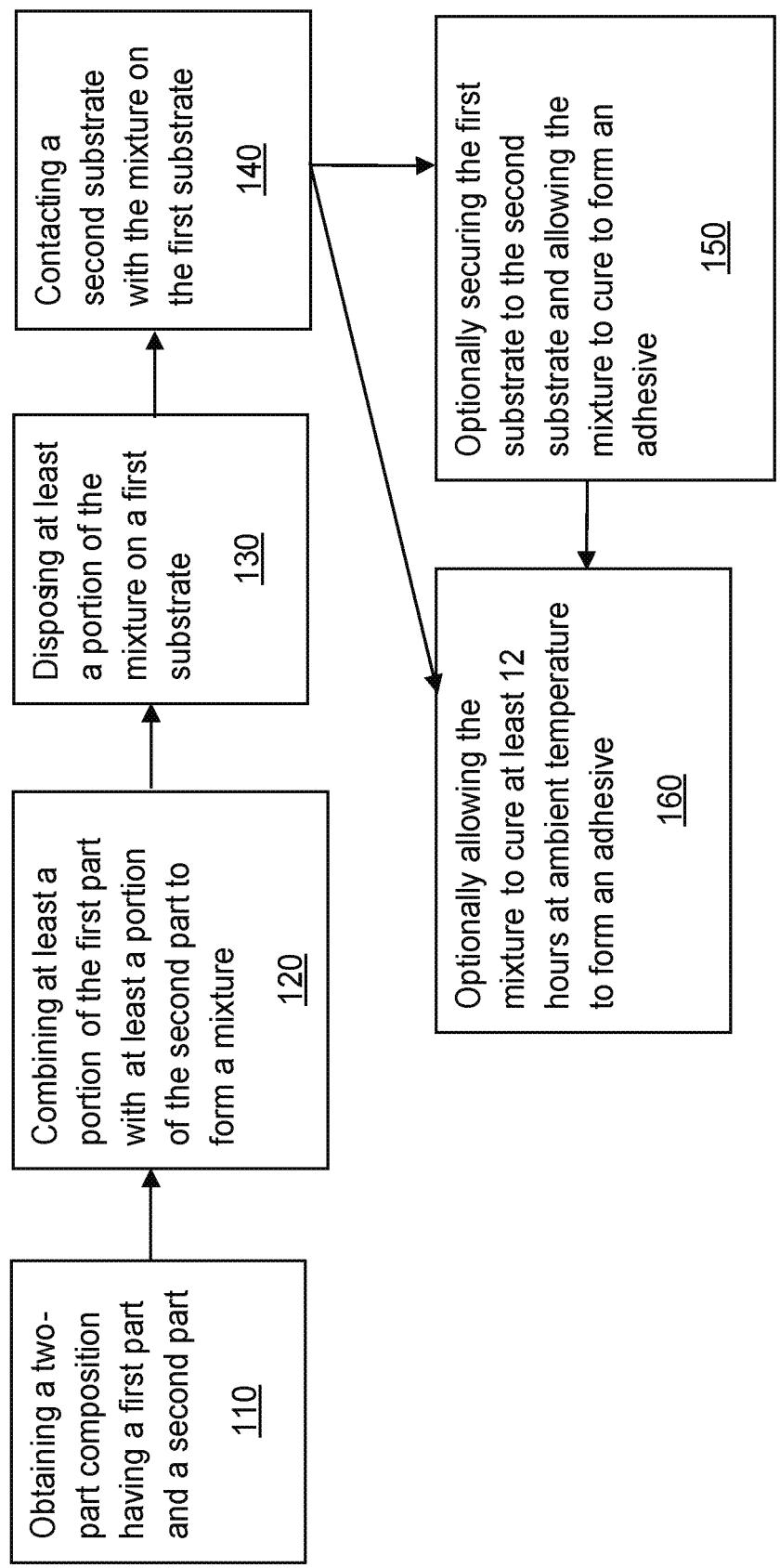
FIG. 1 is a flow chart of an exemplary method of adhering two substrates together, according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Thermal management plays an important role in many electronics applications such as, for example, electric vehicle (EV) battery assembly, power electronics, electronic packaging, LED, solar cells, electric grid, and the like. Certain thermally conductive materials (e.g., adhesives) may be an attractive option for these applications due to good electrical insulative properties, feasibility in processing for integrated parts or complex geometries, and good conformability/wettability to different surfaces, especially the ability to efficiently dissipate the heat away while having good adhesion to different substrates for assembly.

Regarding applications in EV battery assemblies, currently, one such application that utilizes a thermally conductive material is the gap filler application. Generally, requirements for the gap filler application include high thermal conductivity, good overlap shear adhesion strength, good tensile strength, good elongation at break for toughness, and good damping performance, in addition to having low viscosity before curing. However, to achieve high thermal conductivity, typically, a large amount of inorganic thermally conductive filler is added to the composition. The high loading of thermally conductive fillers, however, has a deleterious impact on adhesion performance, toughness, damping performance, and viscosity.

Many current compositions employed in the EV thermal adhesive gap filler application are based on polyurethane curing chemistries. While these polyurethane based materials can exhibit properties that render them suitable as gap filler materials, the isocyanates used in such products pose safety concerns as well as poor storage stability.

In order to solve the above-discussed problems associated with high loadings of inorganic thermally conductive filler and the safety concerns associated with polyurethane based compositions, a curable composition providing a good balance of the desired properties has been discovered that includes polymeric materials, curable compositions, two-part compositions, and products useful for instance in coatings and/or adhesives that have good flowability and reactivity (e.g., without added solvent), contain a high inorganic filler content, acceptable cure and/or adhesion in a short amount of time, as compared to similar compositions instead containing isocyanates. Further, coatings and adhesives according to at least certain embodiments of the present disclosure are essentially free of isocyanates. This is advantageous because isocyanates tend to be sensitizers upon first contact (e.g., to skin) such that subsequent contact causes inflammation. Coatings/adhesives containing isocyanates exhibit more sensitivity to water than other compounds, as noted above, so minimizing an isocyanate content in a coating or adhesive may improve reliability during curing as well as simplify storage and handling of the polymeric materials, curable compositions, and two-part compositions.

The terms "a", "an", "the", "at least one", and "one or more" are used interchangeably.

The term "and/or" means one or both such as in the expression A and/or B refers to A alone, B alone, or to both A and B.

The term "essentially" means 95% or more.

The term "equivalents" refers to the number of moles of a functional group (e.g., OH groups, isocyanate groups, uretdione groups, etc.) per molecule of a polymer chain or per mole of a different functional group.

The term "amidine group" does not refer an amidine group in an imidazole ring, although the amidine group may be contained in one or more other rings (e.g., 1,5-diazabicyclo[4.3.0]non-5-ene or 1,8-diazabicyclo[5.4.0]undec-7-ene);

The term "alkyl" refers to a monovalent radical of an alkane. Suitable alkyl groups can have up to 50 carbon atoms, up to 40 carbon atoms, up to 30 carbon atoms, up to 20 carbon atoms, up to 16 carbon atoms, up to 12 carbon atoms, up to 10 carbon atoms, up to 8 carbon atoms, up to 6 carbon atoms, up to 4 carbon atoms, or up to 3 carbon atoms. The alkyl groups can be linear, branched, cyclic, or a combination thereof. Linear alkyl groups often have 1 to 30 carbon atoms, 1 to 20 carbon atoms, 1 to 10 carbon atoms, 1 to 6 carbon atoms, or 1 to 4 carbon atoms. Branched alkyl groups often have 3 to 50 carbon atoms, 3 to 40 carbon atoms, 4 to 20 carbon atoms, 3 to 10 carbon atoms, or 3 to 6 carbon atoms. Cyclic alkyl groups often have 3 to 50 carbon atoms, 5 to 40 carbon atoms, 6 to 20 carbon atoms, 5 to 10 carbon atoms, or 6 to 10 carbon atoms.

The term "alkylene" refers to a divalent group that is a radical of an alkane. The alkylene can be straight-chained, branched, cyclic, or combinations thereof. The alkylene typically has 1 to 20 carbon atoms. In some embodiments, the alkylene contains 4 to 14 carbon atoms, 1 to 10 carbon atoms, 1 to 8 carbon atoms, 1 to 6 carbon atoms, or 1 to 4 carbon atoms. The radical centers of the alkylene can be on the same carbon atom (i.e., an alkylidene) or on different carbon atoms. In certain embodiments, the alkylene can be substituted with an OH group.

The term "alkane-triyl" refers to a trivalent radical of an alkane.

The term "aryl" refers to a monovalent group that is radical of an arene, which is a carbocyclic, aromatic compound. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, naphthyl, acenaphthyl, anthraquinonyl, phenanthryl, anthracenyl, pyrenyl, perylenyl, and fluorenyl.

The term "aralkyl" refers to a monovalent group of formula —R—Ar where R is an alkylene and Ar is an aryl group. That is, the aralkyl is an alkyl substituted with an aryl.

The term "aralkylene" refers to a divalent group of formula —R—$Ar^a$— where R is an alkylene and $Ar^a$ is an arylene (i.e., an alkylene is bonded to an arylene).

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The term "alkarylene" refers to a divalent group that is an arylene group substituted with an alkyl group or an arylene group attached to an alkylene group. Unless otherwise indicated, the alkarylene group typically has from 1 to 20 carbon atoms, 4 to 14 carbon atoms, 1 to 10 carbon atoms, 1 to 6 carbon atoms, or 1 to 4 carbon atoms. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms. In certain embodiments, the arylene group or the alkarylene group has 4 to 14 carbon atoms.

The term "aprotic" refers to a component that does not have a hydrogen atom bound to an oxygen (as in a hydroxyl group) or a nitrogen (as in an amine group). In general terms, any component that does not contain labile H+ is called an aprotic component. The molecules of such components cannot donate protons (H+) to other components.

The term "carbamate" refers to a compound having the general formula R—N(H)—C(O)—O—R'. Preferred R groups include alkylene groups.

The term "diisocyanate" refers to a compound having the general formula O=C=N—R—N=C=O. Preferred R groups include alkylene and arylene groups.

The term "diol" refers to a compound with two OH groups.

The term "sulfhydryl group" refers to the —SH group.

The term "triamine" refers to a compound with three amino groups.

The term "polyester" refers to repeating difunctional polymer wherein the repeat units are joined by ester linkages. Ester groups have the general formula —R—C(O)—OR'. The term "polyether" refers to repeating difunctional alkoxy radicals having the general formula —O—R—. Preferred R and R' groups have the general formula —$C_nH_{2n}$— and include, for example, methylene, ethylene and propylene (including n-propylene and i-propylene) or a combination thereof. Combinations of R and R' groups may be provided, for example, as random or block type copolymers.

The term "polyol" refers to a compound with two or more hydroxyl (i.e., OH) groups.

The term "polymeric material" refers to any homopolymer, copolymer, terpolymer, and the like, as well as any diluent.

The term "non-reactive diluent" refers to a component that can be added to adjust the viscosity of the curable composition. By "non-reactive" it is meant that the diluent does not participate in a polymerization reaction (e.g., with a curative, a uretdione-containing material, or a hydroxyl-containing compound having one or more OH groups), of the curable composition. The diluent does not react with such components during manufacture of a two-part composition, during manufacture of a sealant, coating, or adhesive, during application of the coating or adhesive to a substrate, or upon aging. Typically, the diluent is substantially free of reactive groups. In some embodiments, the molecular weight of the unreactive diluent is less than the molecular weight of components such as the uretdione-containing material. The non-reactive diluent is not volatile, and substantially remains in the sealant, coating, or adhesive after curing. The boiling point of the non-reactive diluent may be greater than 200° C.

The term "reactive diluent" refers to a component that can be added to adjust the viscosity of the curable composition and does participate in a polymerization reaction (e.g., with a curative, a uretdione-containing material, or a hydroxyl-containing compound having one or more OH groups), of the curable composition. The diluent reacts with such components during at least one of: during application of the sealant, coating, or adhesive to a substrate or upon aging. The diluent includes one or more reactive groups, such as epoxy groups and/or acrylate groups. In some embodiments, the molecular weight of the reactive diluent is less than the molecular weight of components such as the uretdione-containing material.

The term "primary alcohol" refers to an alcohol in which the OH group is connected to a primary carbon atom (e.g., having the general formula —$CH_2OH$). The term "secondary alcohol" refers to an alcohol in which the OH group is connected to a secondary carbon atom (e.g., having the general formula —CHROH, where R is a group containing a carbon atom).

The term "ambient temperature" refers to a temperature in the range of 20 degrees Celsius to 25 degrees Celsius, inclusive.

The term "liquid" refers to the state of matter that is not solid or gas, which has a definite volume and an indefinite shape. Liquids encompass emulsions, suspensions, solutions, and pure components (e.g., polymeric resins) and exclude (e.g., solid) powders and particulates.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The term "backbone" refers to the main continuous chain of a polymer.

In a first aspect, a two-part composition is provided. The two-part composition comprises:
1) a first part comprising a polymeric material comprising:
   a) a polymerized reaction product of a polymerizable composition comprising components, the components comprising:
      i) a uretdione-containing material comprising a reaction product of a diisocyanate reacted with itself,
      ii) a first hydroxyl-containing compound having more than one OH group; and
      iii) an optional second hydroxyl-containing compound having a single OH group, wherein the second hydroxyl-containing compound is a primary alcohol or a secondary alcohol; and
   b) 40% by weight or greater of an inorganic filler, based on the total weight of the polymeric material;
   wherein the polymerized reaction product comprises a uretdione functionality of 1.3 to 2.5 and wherein the polymerized reaction product has a number average molecular weight (Mn) of 1100 grams per mole (g/mol) or greater; and
2) a second part comprising:
   a) a polythiol having an average sulfhydryl group functionality of 2 or greater; and
   b) 40% by weight or greater of an inorganic filler, based on the total weight of the second part.

It has unexpectedly been discovered that it is possible to prepare a polymeric material containing a high loading of inorganic filler that has acceptable viscosity by selecting the components to provide a polymerized reaction product having both a uretdione functionality of 1.3 to 2.5 and an Mn of 1100 g/mol or greater. In some embodiments, the polymerized reaction product has a number average molecular weight (Mn) of 1200 g/mol or greater, 1300 g/mol or greater, 1400 g/mol or greater, 1500 g/mol or greater, 1600 g/mol or greater, 1700 g/mol or greater, 1800 g/mol or greater, 1900 g/mol or greater, or 2000 g/mol or greater; and 3000 g/mol or less, 2900 g/mol or less, 2800 g/mol or less, 2700 g/mol or less, 2600 g/mol or less, 2500 g/mol or less, 2400 g/mol or less, 2300 g/mol or less, 2200 g/mol or less, 2100 g/mol or less, or 2000 g/mol or less.

A uretdione can be formed by the reaction of a diisocyanate with itself and has the following general formula:

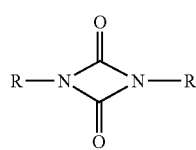

In some embodiments, the diisocyanate comprises a functional group selected from Formula X, Formula XI, and Formula XII:

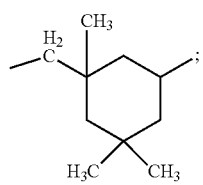

X

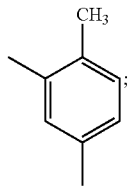

XI

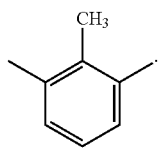

XII

There are a variety of reaction products that can occur as a diisocyanate reacts with itself, and typically the reaction of a diisocyanate with itself results in a blend of two or more reaction products. Preferably, the reaction of a diisocyanate with itself proceeds to a degree such that the polymeric material contains 25% by weight or less or 23% by weight or less of isocyanate groups, as determined by infrared Fourier Transform spectroscopy (e.g., a Nicolet 6700 FT-IP Spectrometer, Thermo Scientific (Madison, Wis.)) where the weight percent of isocyanate in a material is calculated as the moles of isocyanate functional groups multiplied by 42 grams per mole (g/mol) and divided by the mass of the material.

In certain embodiments, the uretdione-containing material comprises a compound of Formula:

$$O=C=N-R_1-N\underset{O}{\overset{O}{\diamond}}N-R_1-N=C=O$$

I wherein $R_1$ is independently selected from a $C_4$ to $C_{14}$ alkylene, arylene, and alkaralyene. In some embodiments, the diisocyanate comprises hexamethylene diisocyanate. One preferable uretdione-containing material is a hexamethylene diisocyanate-based blend of materials comprising uretdione functional groups, commercially available under the trade name DESMODUR N3400 from Covestro (Leverkusen, Germany). Additional uretdione-containing materials are commercially available under the trade name CRELAN EF 403 also from Covestro, and under the trade name METALINK U/ISOQURE TT from Isochem Incorporated (New Albany, Ohio).

Typically, the polymerized reaction product comprises greater than one uretdione functional group in a backbone of the polymerized reaction product, such as an average of 1.3 or greater of a uretdione functional group in a backbone of the polymerized reaction product, 1.4 or greater, 1.5 or greater, 1.6 or greater, 1.7 or greater, 1.8 or greater, 1.9 or greater, or 2.0 or greater; and an average of 2.5 or less of a uretdione functional group in a backbone of the polymerized reaction product, 2.4 or less, 2.3 or less, 2.2 or less, 2.1 or less, 2.0 or less, 1.9 or less, or even an average of 1.8 or less of a uretdione functional group in a backbone of the polymerized reaction product. Stated another way, the polymerized reaction product may comprise an average of 1.3 to 1.8, 1.5 to 2.0, 1.8 to 2.3, or 2.0 to 2.5, of a uretdione functional group in a backbone of the polymerized reaction product. In select embodiments, the polymerized reaction product comprises an average of 1.3 to 2.5, inclusive, of a uretdione functional group in a backbone of the polymerized reaction product and the polymerizable composition is free of the second hydroxyl-containing compound. The amount of the uretdione functional group can be determined as described in the Examples below.

One exemplary simplified general reaction scheme of a uretdione-containing material with a first hydroxyl-containing compound and an (optional) second hydroxyl-containing compound is provided below in Scheme 1:

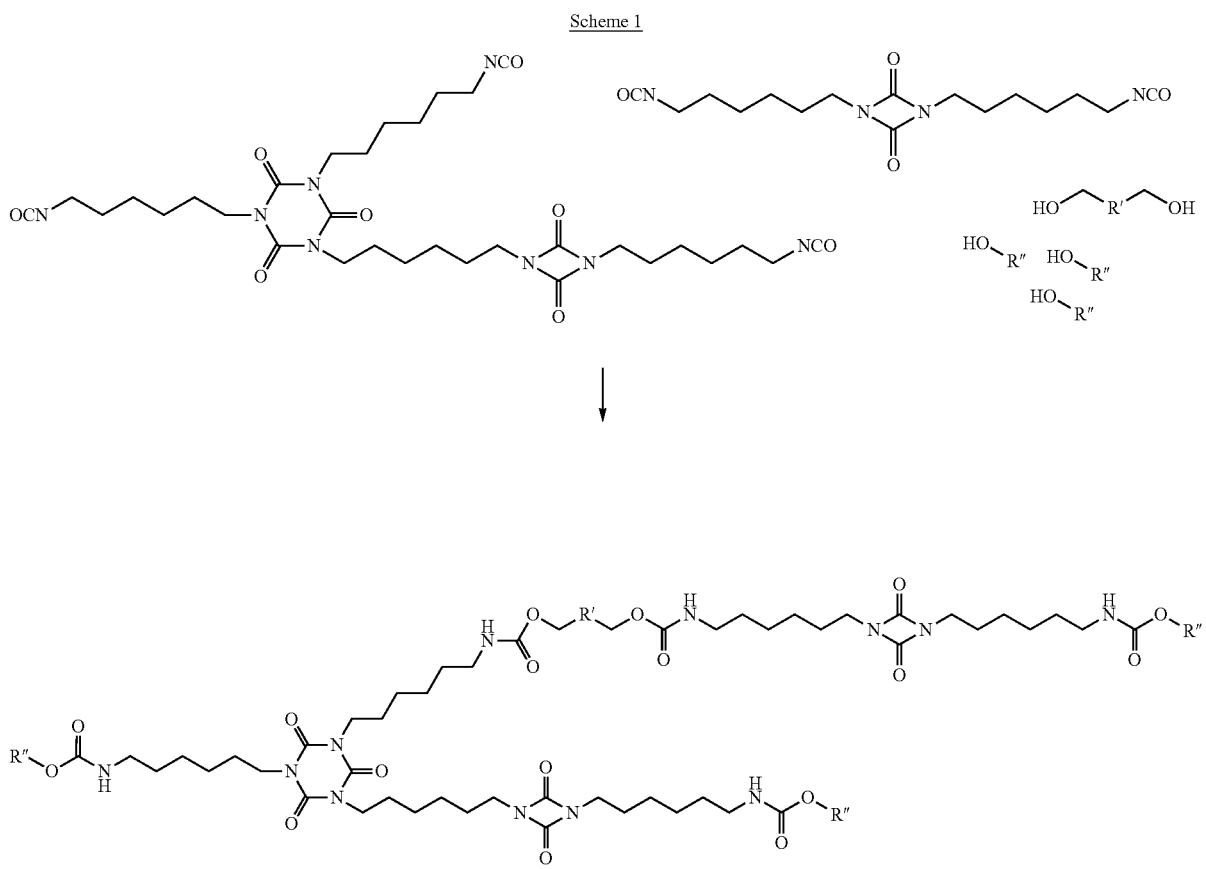

In the particular reaction scheme of Scheme 1, the uretdione-containing material comprises two compounds containing uretdione groups, one of which also contains an isocyanurate compound. In certain embodiments of the polymeric material, the polymeric material comprises an average of 1.3 or fewer isocyanurate units per molecule of the polymeric material. This can be because isocyanurate units may not contribute desirable properties to the polymeric material.

Similarly, an exemplary simplified general reaction scheme of a uretdione-containing material with a first hydroxyl-containing compound, but without the optional second hydroxyl-containing compound is provided below in Scheme 2:

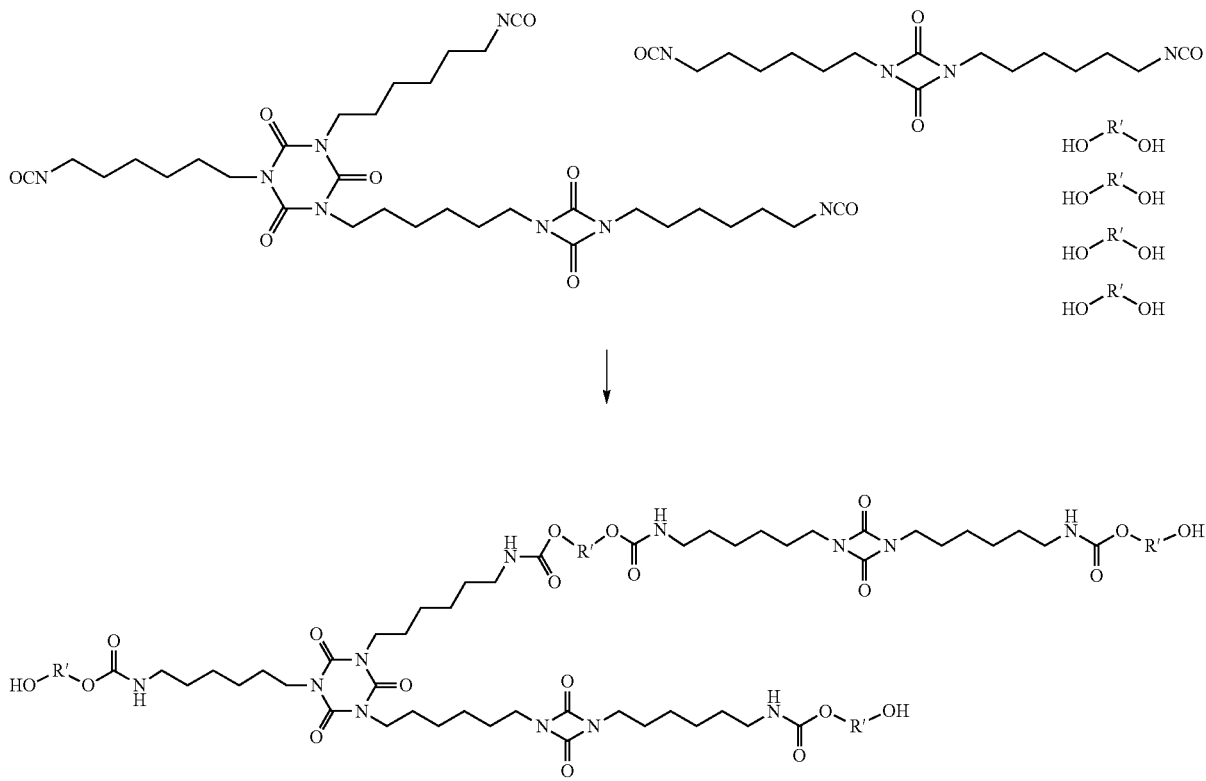

Scheme 2

The polymeric material also typically comprises one or more carbamate functional groups per molecule of the polymerized reaction product of the polymerizable composition in a backbone of the polymerized reaction product. The carbamate functional groups are formed by the reaction of the first hydroxyl-containing compound (and optionally the second hydroxyl-containing compound) with the isocyanate groups present on uretdione-containing compounds. For example, the polymerized reaction product may comprise an average of 0.2 or greater of carbamate functional groups in the backbone of the polymerized reaction product, 0.5 or greater, 1 or greater, 2 or greater, 3 or greater, 4 or greater, 5 or greater, 6 or greater, 7 or greater, or an average of 8 or greater of carbamate functional groups in the backbone of the polymerized reaction product; and an average of 18 or less of carbamate functional groups in the backbone of the polymerized reaction product, 17 or less, 16 or less, 15 or less, 14 or less, 13 or less, 12 or less, 11 or less, 10 or less, or an average of 9 or less of carbamate functional groups in the backbone of the polymerized reaction product. Stated another way, the polymerized reaction product may comprise an average of 0.2 to 18, inclusive, or 2 to 10, inclusive, of carbamate functional groups in the backbone of the polymerized reaction product. The average carbamate functional group content of the polymerized reaction product can be determined as described in the Examples below.

In certain embodiments, the first hydroxyl-containing compound is an alkylene polyol, a polyester polyol, or a polyether polyol. Often the first hydroxyl-containing compound is a diol, such as a branched diol. For example, in some embodiments the first hydroxyl-containing compound is of Formula II:

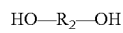

HO—$R_2$—OH   II wherein $R_2$ is selected from $R_3$, an alkylene, and an alkylene substituted with an OH group, wherein $R_3$ is of Formula III or Formula IV:

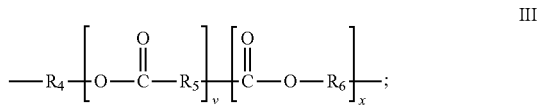

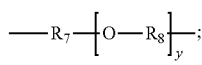

wherein each of $R_4$, $R_5$, $R_6$, $R_7$, and $R_8$ is independently an alkylene, wherein each of v and y is independently 1 to 40, and wherein x is selected from 0 to 40. Optionally, $R_2$ is selected from $C_1$ to $C_{20}$ alkylene and a $C_1$ to $C_{20}$ alkylene substituted with an OH group.

In certain embodiments of the first hydroxyl-containing compound, each of $R_4$, $R_5$, $R_6$, $R_7$, and $R_8$ is independently selected from a $C_1$ to $C_{20}$ alkylene. Alternatively, the first hydroxyl-containing compound can be of Formula V or Formula VI:

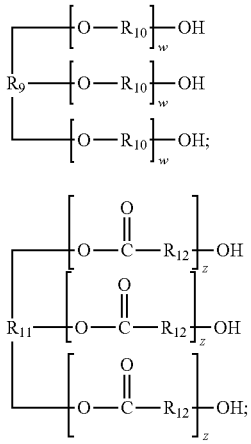

wherein each of $R_9$ and $R_{11}$ is independently an alkanetriyl, wherein each of $R_{10}$ and $R_{12}$ is independently selected from an alkylene, and wherein each of w and z is independently selected from 1 to 20. Preferably, each of $R_{10}$ and $R_{12}$ is independently selected from a $C_1$ to $C_{20}$ alkylene.

Suitable first hydroxyl-containing compounds include branched alcohols, secondary alcohols, or ethers, for instance and without limitation, 2,2-dimethyl-1,3-propanediol, 2-methyl-1,3-propanediol, diethylene glycol, poly(tetramethylene ether) glycol, poly(propylene) glycol, 2-ethylhexane-1,3-diol, and 1,3-butanediol. Such suitable first hydroxyl-containing compounds are commercially available from chemical suppliers including for example, Alfa Aesar (Ward Hill, Mass.), JT Baker (Center Valley, Pa.), TCI (Portland, Oreg.), and Fisher Scientific (Waltham, Mass.). In select embodiments, the first hydroxyl-containing compound comprises a polypropylene glycol polyol or a poly(tetramethylene ether) glycol. Preferably, the first hydroxyl-containing compound has a number average molecular weight (Mn) of 500 to 4,000 g/mol, inclusive, 650-3,000 g/mol, inclusive, or 1,000-2,100 g/mol, inclusive. It has been discovered that these Mn ranges of first hydroxyl-containing compound tends to produce a good balance of viscosity, flexibility, and toughness. When using first hydroxyl-containing compounds having a number average molecular weight that is too low, the carbamate groups of the resulting polymerized reaction product are more concentrated, leading to high viscosities, higher glass transition temperatures, and lower elongations. When using first hydroxyl-containing compounds having a number average molecular weight that is too high, the carbamate groups of the resulting polymerized reaction product are too dilute and the toughness of a urethane is not achieved. In addition, with even higher weights, the polymerized reaction product molecular weight gets higher and the viscosity gets high.

In certain embodiments, the optional second hydroxyl-containing compound is an alkyl alcohol, a polyester alcohol, or a polyether alcohol, such as a branched alcohol and/or a secondary alcohol. For example, in some embodiments the second hydroxyl-containing compound is present and is of Formula VII:

$$R_{13}\text{—OH} \qquad \text{VII;}$$

wherein $R_{13}$ is selected from $R_{14}$, $R_{15}$, and a $C_1$ to $C_{50}$ alkyl;

wherein $R_{14}$ is of Formula VIII:

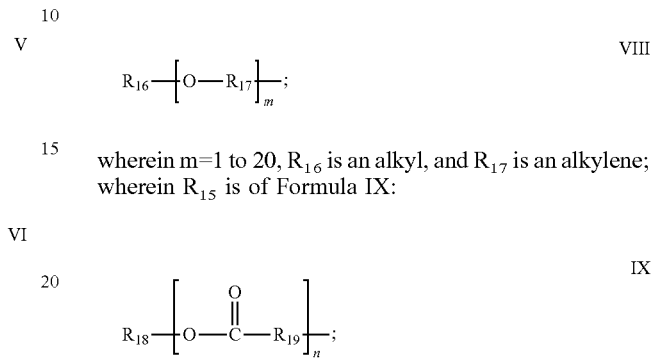

wherein m=1 to 20, $R_{16}$ is an alkyl, and $R_{17}$ is an alkylene; wherein $R_{15}$ is of Formula IX:

$$R_{18}\!\!-\!\!\!\left[\!\!\begin{array}{c}\text{O}\\ \|\\ \text{O}\!\!-\!\!\text{C}\!\!-\!\!R_{19}\end{array}\!\!\right]_{n}\!\!\!-\!; \qquad \text{IX}$$

wherein n=1 to 20, $R_{18}$ is an alkyl, and $R_{19}$ is an alkylene. Preferably, $R_{13}$ is a $C_4$-$C_{20}$ alkyl, as the alkyl groups below $C_4$ have a tendency to form a crystalline polymeric material.

Suitable optional second hydroxyl-containing compounds can include branched alcohols or secondary alcohols, for instance and without limitation, 2-butanol, 2-ethyl-1-hexanol, isobutanol, and 2-butyl-octanol, each of which is commercially available from Alfa Aesar (Ward Hill, Mass.).

In an embodiment, the first hydroxyl-containing compound is of Formula II and the optional second hydroxyl-containing compound is present and is of Formula VII, wherein $R_2$ of the compound of Formula II is of Formula III, and wherein $R_{13}$ of the compound of Formula VII is a branched $C_4$ to $C_{20}$ alkyl.

In select embodiments, the first hydroxyl-containing compound is a diol and the reaction product comprises 0.2 to 0.65, inclusive, or 0.25 to 0.61, inclusive, of diol equivalents relative to isocyanate equivalents. Optionally, a sum of the OH equivalents of the first hydroxyl-containing compound and the (optional) second hydroxyl-containing compound is equal to or greater than the isocyanate equivalents of the polymeric material.

Preferably, the polymeric material is essentially free of isocyanates. By "essentially free of isocyanates" it is meant that the polymeric material contains 5% by weight or less, 4% by weight or less, 3% by weight or less, 2% by weight or less, or 1% by weight or less of isocyanate groups, as determined by infrared Fourier Transform spectroscopy (e.g., a Nicolet 6700 FT-IP Spectrometer, Thermo Scientific (Madison, Wis.)), where the weight percent of isocyanate in a material is calculated as the moles of isocyanate functional groups multiplied by 42 g/mol and divided by the mass of the material.

Regarding any of the polymeric materials described above, the polymerized reaction product is optionally present in an amount of 5% by weight or greater, based on the total weight of the polymeric material, 10% by weight or greater, 15% by weight or greater, 20% by weight or greater, 30% by weight or greater, 40% by weight or greater, or 50% by weight or greater, based on the total weight of the polymeric material; and 60% by weight or less or 55% by weight or less, based on the total weight of the polymeric material. Stated another way, the polymerized reaction product may be present in an amount of 5% by weight to 60% by weight, 10% by weight to 50% by weight, 5% by weight to 30% by weight, or 15% by weight to 60% by weight, inclusive, based on the total weight of the polymeric material.

In preferred embodiments, the polymeric material contains less than 10 weight percent of total solvent content, preferably less than 5 weight percent of total solvent content, more preferably less than 1 weight percent of total solvent content. In some embodiments, the polymeric material is solvent-free. Typically, the polymeric material is in the form of a liquid, as opposed to a solid (e.g., dry powder, pellets, etc.) despite having a high solids content.

Regarding any of the polymeric materials described above, the components optionally include at least one epoxy component to provide improvement in the viscosity of a polymeric material including a uretdione-containing material.

The epoxy component may optionally include an epoxy resin comprising one or more epoxy compounds that can be monomeric or polymeric, and aliphatic, cycloaliphatic, heterocyclic, aromatic, hydrogenated, and/or a mixture thereof. Preferred epoxy compounds contain more than 1.5 epoxy groups per molecule and more preferably at least 2 epoxide groups per molecule.

The epoxy component can include linear polymeric epoxides having terminal epoxy groups (e.g., a diglycidyl ether of a polyoxyalkylene glycol), polymeric epoxides having skeletal epoxy groups (e.g., polybutadiene poly epoxy), polymeric epoxides having pendant epoxy groups (e.g., a glycidyl methacrylate polymer or copolymer), or a mixture thereof.

Exemplary epoxy compounds include, for example, aliphatic (including cycloaliphatic) and aromatic epoxy compounds. The epoxy compound(s) may be monomeric, oligomeric, or polymeric epoxides, or a combination thereof. The epoxy component may be a pure compound or a mixture comprising at least two epoxy compounds. The epoxy component typically has, on average, at least 1 epoxy (i.e., oxiranyl) group per molecule, preferably at least about 1.5 and more preferably at least about 2 epoxy groups per molecule. Hence, the epoxy component may comprise at least one monofunctional epoxy, and/or may comprise at least one multifunctional epoxy. In some cases, 3 (e.g., trifunctional), 4, 5, or even 6 epoxy groups may be present, on average.

Polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). Other useful epoxy components are polyhydric phenolic formaldehyde condensation products as well as polyglycidyl ethers that contain as reactive groups only epoxy groups or hydroxy groups. In certain embodiments, the epoxy component comprises at least one glycidyl ether group. The "average" number of epoxy groups per molecule can be determined by dividing the total number of epoxy groups in the epoxy-containing material by the total number of epoxy-containing molecules present.

The choice of epoxy component may depend upon the intended end use. For example, epoxides with flexible backbones may be desired where a greater amount of ductility is needed in the bond line. Materials such as diglycidyl ethers of bisphenol A and diglycidyl ethers of bisphenol F can help impart desirable structural adhesive properties upon curing, while hydrogenated versions of these epoxies may be useful for compatibility with substrates having oily surfaces.

Commercially available epoxy compounds include octadecylene oxide, epichlorohydrin, styrene oxide, vinylcyclohexene oxide, glycidol, glycidyl methacrylate, vinylcyclohexene dioxide, 3,4-epoxycyclohexylmethyl-3,4-epoxycyclohexenecarboxylate, 3,4-epoxy-6-methylcyclohexylmethyl-3,4-epoxy-6-methylcyclohexene carboxylate, bis(3,4-epoxy-6-methylcyclohexylmethyl) adipate, bis(2,3-epoxycyclopentyl) ether, dipentene dioxide, silicone resin containing epoxy functionality, flame retardant epoxy resins (e.g., DER-580, a brominated bisphenol type epoxy resin available from Dow Chemical Co.), 1,4-butanediol diglycidyl ether of phenol-formaldehyde novolac (e.g., DEN-431 and DEN-438 from Dow Chemical Co.), and resorcinol diglycidyl ether (e.g., Kopoxite from Koppers Company, Inc.), bis(3,4-epoxycyclohexyl)adipate, 2-(3,4-epoxycyclohexyl-5,5-spiro-3,4-epoxy) cyclohexene metadioxane, vinylcyclohexene monoxide 1,2-epoxyhexadecane, alkyl glycidyl ethers such as (e.g., HELOXY Modifier 7 from Hexion Inc., Columbus, Ohio), alkyl $C_{12}$-$C_{14}$ glycidyl ether (e.g., HELOXY Modifier 8 from Hexion Inc.), butyl glycidyl ether (e.g., HELOXY Modifier 61 from Hexion Inc.), cresyl glycidyl ether (e.g., HELOXY Modifier 62 from Hexion Inc.), p-tert-butylphenyl glycidyl ether (e.g., HELOXY Modifier 65 from Hexion Inc.), polyfunctional glycidyl ethers such as diglycidyl ether of 1,4-butanediol (e.g., HELOXY Modifier 67 from Hexion Inc.), diglycidyl ether of neopentyl glycol (e.g., HELOXY Modifier 68 from Hexion Inc.), diglycidyl ether of cyclohexanedimethanol (e.g., HELOXY Modifier 107 from Hexion Inc), trimethylolethane triglycidyl ether (e.g., HELOXY Modifier 44 from Hexion Inc.), trimethylolpropane triglycidyl ether (e.g., HELOXY Modifier 48 from Hexion Inc.), polyglycidyl ether of an aliphatic polyol (e.g., HELOXY Modifier 84 from Hexion Inc.), polyglycol diepoxide (e.g., HELOXY Modifier 32 from Hexion Inc.), bisphenol F epoxides, 9,9-bis[4-(2,3-epoxypropoxy)phenyl]fluorenone (e.g., EPON 1079 from Hexion Inc.).

In certain embodiments, the epoxy component comprises an epoxidised (poly)olefinic resin, an epoxidised phenolic novolac resin, an epoxidised cresol novolac resin, a cycloaliphatic epoxy resin, or a combination thereof. Commercially available epoxy resins include for instance, epoxidised linseed oil (e.g., VIKOFLEX 7190 from Arkema Inc., King of Prussia, Pa.), epoxy phenol novolac resin (e.g., EPAL-LOY 8250 from CVC Specialty Chemicals, Moorestown, N.J.), multifunctional ephichlorohydrin/cresol novolac epoxy resin (e.g., EPON 164 from Hexion Inc.), and cycloaliphatic epoxy resin (e.g., CELLOXIDE 2021 from Daicel Chemical Industries, Ltd., Tokyo, Japan).

In some embodiments, the epoxy component contains one or more epoxy compounds having an epoxy equivalent weight of from 100 g/mole to 1500 g/mol. More preferably, the epoxy resin contains one or more epoxy compounds having an epoxy equivalent weight of from 300 g/mole to 1200 g/mole. Even more preferably, the curable composition contains two or more epoxy compounds, wherein at least one epoxy resin has an epoxy equivalent weight of from 300 g/mole to 500 g/mole, and at least one epoxy resin has an epoxy equivalent weight of from 1000 g/mole to 1200 g/mole.

Useful epoxy compounds also include glycidyl ethers, e.g., such as those prepared by reacting a polyhydric alcohol with epichlorohydrin. Such polyhydric alcohols may include butanediol, polyethylene glycol, and glycerin.

Useful epoxy compounds also include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2'-, 2,3'-, 2,4'-, 3,3'-, 3,4'-, and 4,4'-isomers of dihydroxydiphenylmethane, dihydroxydiphenyldimethylmethane, dihydroxydiphenylethylmethylmethane, dihydroxydiphenylmethylpropylmethane, dihydroxy-diphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Similarly, useful epoxy compounds also include a polyglycidyl ether of a polyhydric phenol. Example polyglycidyl ethers of a polyhydric phenol include a polyglycidyl ether of bisphenol A, bisphenol F, bisphenol AD, catechol, or resorcinol.

Useful epoxy compounds also include glycidyl ether esters and polyglycidyl esters. A glycidyl ether ester may be obtained by reacting a hydroxycarboxylic acid with epichlorohydrin. A polyglycidyl ether may be obtained by reacting a polycarboxylic acid with epichlorohydrin. Such polycarboxylic acids may include a dimer acid (e.g., RADIACID 0950 from Oleon, Simpsonville, S.C.), and a trimer acid (e.g., RADIACID 0983 from Oleon). Suitable glycidyl esters include a glycidyl ester of neodecanoic acid (e.g., ERISYS GS-110 from CVC Specialty Chemicals) and a glycidyl ester of a dimer acid (e.g., ERISYS GS-120 from CVC Specialty Chemicals).

Exemplary epoxy compounds also include glycidyl ethers of bisphenol A, bisphenol F, and novolac resins as well as glycidyl ethers of aliphatic or cycloaliphatic diols. Examples of commercially available glycidyl ethers include diglycidyl ethers of bisphenol A such as those available as EPON 828, EPON 1001, EPON 1310, and EPON 1510 from Hexion Inc.; those available under the trade name D.E.R. (e.g., D.E.R. 331, 332, and 334) from Dow Chemical Co., Midland, Mich.; those available under the trade name EPICLON from Dainippon Ink and Chemicals, Inc. (e.g., EPICLON 840 and 850) and those available under the trade name YL-980 from Japan Epoxy Resins Co., Ltd.); diglycidyl ethers of bisphenol F (e.g., those available under the trade name EPICLON from Dainippon Ink and Chemicals, Inc. (e.g., EPICLON 830)); glycidyl ethers of novolac resins (e.g., novolac epoxy resins, such as those available under the trade name D.E.N. from Dow Chemical Co. (e.g., D.E.N. 425, 431, and 438)); and flame retardant epoxy resins (e.g., D.E.R. 580, a brominated bisphenol type epoxy resin available from Dow Chemical Co.). In some embodiments, aromatic glycidyl ethers, such as those prepared by reacting a dihydric phenol with an excess of epichlorohydrin, may be preferred. In some embodiments, nitrile rubber modified epoxies may be used (e.g., KELPOXY 1341 available from CVC Chemical).

Low viscosity epoxy compound(s) may be included in the epoxy component, for example, to reduce viscosity as noted above. For instance, in some embodiments, the epoxy component exhibits a dynamic viscosity of 100,000 centipoises (cP) or less, 75,000 cP or less, 50,000 cP or less, 30,000 cP or less, 20,000 cP or less, 15,000 cP or less, 10,000 cP or less, 9,000 cP or less, 8,000 cP or less, 7,000 cP or less, 6,000 cP or less, 5,000 cP or less, 4,000 cP or less, or 3,000 cP or less, as determined using a Brookfield viscometer. Conditions for the dynamic viscosity test include use of a LV4 spindle at a speed of 0.3 or 0.6 revolutions per minute (RPM) at 24 degrees Celsius. In some embodiments, one or more epoxy components each has a molecular weight of 2,000 grams per mole or less. Examples of low viscosity epoxy compounds include: cyclohexanedimethanol diglycidyl ether, resorcinol diglycidyl ether, p-tert-butylphenyl glycidyl ether, cresyl glycidyl ether, diglycidyl ether of neopentyl glycol, triglycidyl ether of trimethylolethane, triglycidyl ether of trimethylolpropane, triglycidyl p-aminophenol, N,N'-diglycidylaniline, N,N,N',N'-tetraglycidyl meta-xylenediamine, and vegetable oil polyglycidyl ether.

The epoxy resin component is often a mixture of materials. For example, the epoxy resins can be selected to be a mixture that provides the desired viscosity or flow characteristics prior to curing. For example, within the epoxy resin may be reactive diluents that include monofunctional or certain multifunctional epoxy resins. The reactive diluent should have a viscosity which is lower than that of the epoxy resin having at least two epoxy groups. The reactive diluent tends to lower the viscosity of the epoxy/uretdione-containing material composition and often has either a branched backbone that is saturated or a cyclic backbone that is saturated or unsaturated. In select embodiments, preferred reactive diluents have only one functional group (i.e., oxirane group) such as various monoglycidyl ethers. Some exemplary monofunctional epoxy resins include, but are not limited to, those with an alkyl group having 6 to 28 carbon atoms, such as ($C_6$-$C_{28}$)alkyl glycidyl ethers, ($C_6$-$C_{28}$)fatty acid glycidyl esters, ($C_6$-$C_{28}$)alkylphenol glycidyl ethers, and combinations thereof. In the event a monofunctional epoxy resin is the reactive diluent, such monofunctional epoxy resin should be employed in an amount of up to 50 parts based on the total of the epoxy resin component.

In some embodiments, high viscosity epoxy compound(s) may be included in the epoxy component, for example, to provide structural integrity to the final composition. For instance, in some embodiments, the epoxy component exhibits a dynamic viscosity of 100,000 cP or less, 50,000 cP or less, or 20,000 cP or less; and 1,000 cP or more, as determined using a Brookfield viscometer, using the conditions described above.

Certain epoxy components can advantageously be used in high amounts, e.g., 30% to 45% by weight, based on the total weight of a polymeric material, and maintain an acceptable structural integrity of a coating or adhesive. Such epoxy components preferable for use in such amounts include for instance, a polyglycidyl ether of a polyhydric phenol (preferably a polyglycidyl ether of bisphenol A, bisphenol F, bisphenol AD, catechol, or resorcinol), or at least one of an epoxidised (poly)olefinic resin, epoxidised phenolic novolac resin, epoxidised cresol novolac resin, or a cycloaliphatic epoxy resin.

In some embodiments, the polymeric material comprises an epoxy component in an amount of 2% by weight or greater, based on the total weight of the polymeric material, 3% by weight or greater, 4% by weight or greater, 5% by weight or greater, 6% by weight or greater, 7% by weight or greater, 8% by weight or greater, 9% by weight or greater, or 10% by weight or greater; and 45% by weight or less, 42% by weight or less, 40% by weight or less, 38% by weight or less, 35% by weight or less, 32% by weight or less, 30% by weight or less, 28% by weight or less, 25% by weight or less, 22% by weight or less, 20% by weight or less, 18% by weight or less, or 15% by weight or less, based on the total weight of the polymeric material, Stated another way, the epoxy component may be present in an amount of 2 to 45% by weight, 5 to 30% or 10 to 25% by weight, based on the total weight of the polymeric material.

Regarding any of the polymeric materials described above, an acrylate component is optionally included, for instance as a reactive diluent. In some embodiments, suitable acrylate components include one or more multifunctional (meth)acrylate components. In some embodiments, the multifunctional (meth)acrylate components may function as crosslinkers. In various embodiments, the multifunctional (meth)acrylates may include multiple (meth)acryloyl groups including di(meth)acrylates, tri(meth)acrylates, tetra(meth)acrylates, or penta(meth)acrylates. The multifunctional (meth)acrylates can be formed, for example, by reacting (meth)acrylic acid with a polyhydric alcohol (i.e., an alcohol having at least two hydroxyl groups). The polyhydric alcohol may have two, three, four, or five hydroxyl groups.

In some embodiments, the multifunctional (meth)acrylate components may include at least two (meth)acryloyl groups. Exemplary multifunctional acrylates of this type may include, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone. In some embodiments, the multifunctional acrylate components may include three or four (meth)acryloyl groups. Exemplary multifunctional acrylates of this type may include trimethylolpropane triacrylate (e.g., commercially available under the trade designation TMPTA-N from Cytec Industries, Inc., Smyrna, Ga. and under the trade designation SR-351 from Sartomer), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Allnex under the trade designation PETIA, pentaerythritol tetraacrylate (e.g., commercially available under the trade designation SR-295 from Sartomer), di-trimethylolpropane tetraacrylate (e.g., commercially available under the trade designation SR-355 from Sartomer), or ethoxylated pentaerythritol tetraacrylate (e.g., commercially available under the trade designation SR-494 from Sartomer). In some embodiments, the multifunctional acrylate components may include five (meth)acryloyl groups. Exemplary multifunctional acrylates of this type may include dipentaerythritol pentaacrylate (e.g., commercially available under the trade designation SR-399 from Sartomer).

Each of the polymeric material and the second part may further comprise one or more additives, e.g., catalysts, plasticizers, non-reactive diluents, toughening agents, fillers, flow control agents, colorants (e.g., pigments and dyes), adhesion promoters, UV stabilizers, flexibilizers, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the tradename EXPANCEL by Expancel Inc. (Duluth, Ga.).

The selection and loading levels of the inorganic fillers in each of the first part and the second part is optionally used to control the thermal conductivity of the composition. Generally, any known thermally conductive fillers may be used, although electrically insulating fillers may be preferred where breakthrough voltage is a concern. Suitable electrically insulating, thermally conductive fillers include ceramics such as oxides, hydroxides, oxyhydroxides, silicates, borides, carbides, and nitrides. Suitable ceramic fillers include, e.g., silicon oxide, zinc oxide, aluminum oxide, aluminum trihydroxide (ATH), boron nitride, silicon carbide, and beryllium oxide. In some embodiments, the thermally conductive filler includes ATH. It is to be appreciated that while ATH is not generally used in the polyurethane based compositions commonly employed in thermal management materials because of its reactivity with isocyanate species and the resultant formulation difficulties, compositions of the present disclosure are able to incorporate such inorganic fillers without drawback. Other thermally conducting fillers include carbon based materials such as carbon nanotubes, graphene, and graphite, and metals such as aluminum and copper. The thermal conductivity of some representative inorganic materials is set forth in the following table.

| Material | Thermally Conductive Materials | | |
|---|---|---|---|
| | Thermal Conductivity (W/m * K) | Electronic Band Gap (eV) | Density |
| α-Aluminum Oxide | 30 | 5-9 | 3.95 g/cc |
| Alumina Trihydrate | 21 | | 2.42-2.45 g/cc |
| Silicon Carbide (SiC) | 120 | 2.4 | 3.21 g/cc |
| Hexagonal Boron Nitride (BN) | 185-300 | 2.1 | 2.1 g/cc |

In some embodiments, suitable thermally conductive particles comprise material(s) having a bulk thermal conductivity of at least 15 or 20 W/m*K. In other embodiments, the thermally conductive particles comprise material(s) having a bulk thermal conductivity of at least 25 or 30 W/m*K. In yet other embodiments, the thermally conductive particles comprise material(s) having a bulk thermal conductivity of at least 50, 75 or 100 W/m*K. In yet other embodiments, the thermally conductive particles comprise material(s) having a bulk thermal conductivity of at least 150 W/m*K. In typical embodiments, the thermally conductive particles comprise material(s) having a bulk thermal conductivity of no greater than about 350 or 300 W/m*K.

The inorganic filler is present in the polymeric material or in the second part an amount of 40% by weight or greater, based on the total weight of the polymeric material or the second part, respectively, 45% by weight or greater, 50% by weight or greater, 55% by weight or greater, 60% by weight or greater, 65% by weight or greater, 70% by weight or greater, 75% by weight or greater, or 80% by weight or greater, based on the total weight of the polymeric material or the second part; and 95% by weight or less, based on the total weight of the polymeric material or the second part, 90% by weight or less, or 85% by weight or less, based on the total weight of the polymeric material or the second part, respectively.

In some embodiments, the inorganic filler is present in an amount of 30% by volume or greater, based on the total volume of the polymeric material or the second part, respectively, 35% by volume or greater, 40% by volume or greater, 45% by volume or greater; or 50% by volume or greater; and 70% by volume or less, based on the total volume of the polymeric material or the second part, 65% by volume or less, 60% by volume or less, or 55% by volume or less, based on the total volume of the polymeric material or the second part, respectively.

Inorganic filler particles are available in numerous shapes, e.g. spheres, irregular, platelike, & acicular. Through-plane thermal conductivity may be important in certain applications. Therefore, in some embodiments, generally symmetrical (e.g., spherical or semi-spherical) fillers may be employed. To facilitate dispersion and increase filler loading, in some embodiments, the inorganic fillers may be surface-treated or coated. Generally, any known surface treatments and coatings may be suitable, including those based on silane, titanate, zirconate, aluminate, and organic acid chemistries. For powder handling purposes, many fillers are available as polycrystalline agglomerates or aggregates with or without binder. Some embodiments may include mixtures of particles and agglomerates in various size and mixtures. Without intending to be bound by theory, it is surmised that including a sufficient amount of smaller particles of the proper particle size improves the thermal conductivity between the larger particles.

With regard to the smaller particles, at least 20, 25, 30, 35, 40, 45, 50 vol. % of the particles have a particle size no greater than 10 microns. In some embodiments, at least 10, 15, 20, 25 30, 35, 40, 45, 50, 55 or 60 vol. % of the particles have a particle size less than 5 microns. In some embodiments, at least 10% of the particles have a particle size less than 1 or 2 microns. In some embodiments, at least 20, 25, or 30 vol. % of the particles have a particle size less than 1 or 2 microns. In other embodiments, less than 10 vol. % of the particles have a particle size less than 1 or 2 microns.

With regard to the larger particles, at least 10, 15, 20, 25 or 30 vol. % of the particles have a particle size of at least 30, 40, or 50 microns. In some embodiments, the larger particles have a particle size of at least 55, 60, 65, 70, 75, 80, 85, 90 or 100 microns. The larger particles typically have a particle size of no greater than 200, 190, 180 microns. In some embodiments, the larger particles have a particle size of no greater than 170, 160, 150, 140 microns. In some embodiments, the larger thermally conductive particles have a particle size of no greater than 130, 120, 110 microns. In some embodiments, the larger thermally conductive particles have a particle size of no greater than 100, 90, 80 microns. In some embodiments, 5 vol. % of the particles have a particle size greater than 55, 60, 65, 70, 75, 80, 85, 90 or 100 microns. In some embodiments, 5 vol. % of the particles have a particle size greater than 110, 115, 120, 125, 130, 135, 140, 145, 150, 155, 160, 166, 170, 175, 180, or 185 microns.

Favorably the polymeric material may comprise 10% by weight or greater, based on the total weight of the polymeric material, of inorganic filler having an average particle size of 30 micrometers or greater, 40 micrometers or greater, or 50 micrometers or greater.

The combination of smaller particles and larger particles can be obtained by selection of certain (e.g. commercially available) particles having at least a bimodal particle size distribution. The combination of smaller particles and larger particles can also be obtained by combining two or more (e.g. commercially available) particles having a normal particle size distribution, but sufficiently different median particles sizes.

Especially when the combination of particles is obtained by combining particles having a normal particle size distribution, but different median particles sizes; the particles further comprises particle having an intermediate particle size. Hence, the particles further comprise particles ranging from greater than 10 to less than 30 microns. The sum of the smaller particles (i.e. no greater than 10 microns), larger particles (at least 30 microns) and intermediate particles is typically 95, 96, 97, 98, 99, or 100% of the thermally conductive particles. The thermally conductive particles may optionally comprise 1, 2, 3, 4, or 5% of (e.g. extralarge) particles, having a particle size greater than 200 microns.

The particle size of the thermally conductive particle can be determined utilizing dynamic light scattering (DLS).

In typical embodiments, particle size refers to the "primary particle size", meaning the diameter of a single (non-aggregate, non-agglomerate) particle. The primary particles can form an "agglomerate", i.e. a weak association between primary particles which may be held together by charge or polarity and can be broken down into smaller entities. These weakly bound agglomerates would typically break down during high energy mixing processes. In some embodiments, the particle size may be the particle size of an aggregate, i.e. two or more primary particles bonded to each other. Depending on the viscosity and mixing technique, the aggregates may break down into smaller entities during mixing.

In some embodiments, polymeric materials according to the present disclosure may include one or more dispersants. Generally, the dispersants may act to stabilize the inorganic filler particles in the composition—without dispersant, the particles may aggregate, thus adversely affecting the benefit of the particles in the composition. Suitable dispersants may depend on the specific identity and surface chemistry of filler. In some embodiments, suitable dispersants according to the present disclosure may include at least a binding group and a compatibilizing segment. The binding group may be ionically bonded to the particle surface. Examples of binding groups for alumina particles include phosphoric acid, phosphonic acid, sulfonic acid, carboxylic acid, and amine. The compatibilizing segment may be selected to be miscible with the polymeric material matrix. Useful compatibilizing agents may include polyalkylene oxides, e.g., polypropylene oxide, polyethylene oxide, as well as polycaprolactones, and combinations thereof. Commercially available examples include BYK W-9010 (BYK Additives and Instruments), BYK W-9012 (BYK Additives and Instruments), Disberbyk 145 (BYK Additives and Instruments), and Solplus D510 (Lubrizol Corporation). In some embodiments, the dispersants may be present in an amount between 0.1 and 10 wt. %, 0.1 and 5 wt. %, 0.5 and 3 wt. %, or 0.5 and 2 wt. %, based on the total weight of the polymeric material or the second part, respectively.

In some embodiments, the dispersant may be pre-mixed with the inorganic filler prior to incorporating into the polymeric material or the second part. Such pre-mixing may facilitate the filled systems behaving like Newtonian fluids or enable shear-thinning effects behavior.

In addition to the above discussed additives, further additives can be included in one or both of the first and second parts. For example, any or all of antioxidants/stabilizers, colorants, abrasive granules, thermal degradation stabilizers, light stabilizers, conductive particles, tackifiers, flow agents, bodying agents, flatting agents, inert fillers, binders, blowing agents, fungicides, bactericides, surfactants, plasticizers, thixotropic agents, and other additives known to those skilled in the art. Suitable thixotropic agents include for instance, ultra-fine silica powder, surfactants, antifoamers, colorants, electrically conductive particles, antistatic agents, and metal deactivators. These additives, if present, are added in an amount effective for their intended purpose.

Catalysts may be present in compositions according to the present disclosure. For example, suitable catalysts can include tertiary amines, amidines, or organometallic catalysts such as tin compounds, bismuth compounds, zinc compounds, and zirconium compounds. Optionally, a bismuth carboxylate may be a suitable catalyst, for instance bismuth neodecanoate and/or bismuth ethylhexanoate. Typically, such catalysts can be included to accelerate reaction of the uretdione-containing material with one or more hydroxyl-containing compounds. In select embodiments, the components are free of catalysts that contain tin.

Either catalysts or retarders can be added to change the cure profile of the polythiol with the polymeric material. They can be included in either part of a two-part composition; with the polymeric material or with the polythiol. Suitable non-reactive diluents can include benzoate esters, for instance and without limitation ethyl benzoate, ethylhexyl benzoate, ethylhexyl hydroxystearate benzoate, $C_{12}$-$C_{15}$ alkyl benzoates, and dipropylene glycol dibenzoate. A commercially available non-reactive diluent includes the material available under the tradename BENZOFLEX 131 from Eastman Chemical (Kingsport, Tenn.). Additionally, organic and/or inorganic acids can be utilized as retarders to delay the cure or extend the pot-life of the material. For example, suitable acids can include carboxylic acids.

A plasticizer is often added to a polymeric material to make the polymeric material more flexible, softer, and more workable (e.g., easier to process). More specifically, the mixture resulting from the addition of the plasticizer to the polymeric material typically has a lower glass transition temperature compared to the polymeric material alone. The glass transition temperature of a polymeric material can be lowered, for example, by at least 30 degrees Celsius, at least 40 degrees Celsius, at least 50 degrees Celsius, at least 60 degrees Celsius, or at least 70 degrees Celsius by the addition of one or more plasticizers. The temperature change (i.e., decrease) tends to correlate with the amount of plasticizer added to the polymeric material. It is the lowering of the glass transition temperature that usually leads to the increased flexibility, increased elongation, and increased workability. Some example plasticizers include various phthalate esters such as diethyl phthalate, diisobutyl phthalate, dibutyl phthalate, diisoheptyl phthalate, dioctyl phthalate, diisooctyl phthalate, dinonyl phthalate, diisononyl phthalate, diisodecyl phthalate, and benzylbutyl phthalate; various adipate esters such as di-2-ethylhexyl adipate, dioctyl adipate, diisononyl adipate, and diisodecyl adipate; various phosphate esters such as tri-2-ethylhexyl phosphate, 2-ethylhexyl diphenyl phosphate, trioctylphosphate, and tricresyl phosphate; various trimellitate esters such as tris-2-ethylhexyl trimellitate and trioctyl trimellitate; various sebacate and azelate esters; and various sulfonate esters. Other example plasticizers include polyester plasticizers that can be formed by a condensation reaction of propanediols or butanediols with adipic acid. Commercially available plasticizers include those available under the tradename JAYFLEX DINA available from ExxonMobil Chemical (Houston, Tex.) and PLASTOMOLL (e.g., diisononyl adipate) from BASF (Florham Park, N.J.).

Another optional additive is a toughening agent. Toughening agents can be added to provide the desired overlap shear, peel resistance, and impact strength. Useful toughening agents are polymers that may react with the optional epoxy resin and that may be cross-linked. Suitable toughening agents include polymeric compounds having both a rubbery phase and a thermoplastic phase or compounds which are capable of forming, with an epoxide resin, both a rubbery phase and a thermoplastic phase on curing. Polymers useful as toughening agents are preferably selected to inhibit cracking of the cured composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the tradenames ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the tradenames KANE ACE (e.g., KANE ACE MX 157, KANE ACE MX 257, and KANE ACE MX 125) from Kaneka Corporation (Japan).

Another class of polymeric toughening agents that are capable of forming, with an optional reactive diluent (e.g., epoxy component and/or acrylate component), a rubbery phase on curing, are carboxyl-terminated butadiene acrylonitrile compounds. Commercially available carboxyl-terminated butadiene acrylonitrile compounds include those available under the tradenames HYCAR (e.g., HYCAR 1300X8, HYCAR 1300X13, and HYCAR 1300X17) from Lubrizol Advanced Materials, Inc. (Cleveland, Ohio) and under the tradename PARALOID (e.g., PARALOID EXL-2650) from Dow Chemical (Midland, Mich.).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt. % to 40 wt. % of the total graft polymer, so that the polymerized thermoplastic portion constitutes from 5 wt. % to 60 wt. % of the graft polymer.

Still other polymeric toughening agents are polyether sulfones such as those commercially available from BASF (Florham Park, N.J.) under the tradename ULTRASON (e.g., ULTRASON E 2020 P SR MICRO).

Further optional additives include a flow control agent or thickener, to provide the desired rheological characteristics to the polymeric material or the second part. Suitable flow control agents include fumed silica, such as treated fumed silica, available under the tradename CAB-O-SIL TS 720, and untreated fumed silica available under the tradename CAB-O-SIL M5, from Cabot Corp. (Alpharetta, Ga.).

In some embodiments, the polymeric material optimally contains adhesion promoters other than a silane adhesion promoter to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The amount and type of such additives may be selected by one skilled in the art, depending on the intended end use of the composition.

In select embodiments, the polymeric material further comprises at least one polythiol having an average sulfhydryl group functionality of 2.0 or greater. The at least one polythiol acts as a curative and can be mixed with the polymeric material when it is desirable to begin curing. Suitable thiols are discussed in detail below.

In certain embodiments, the two-part composition is used in an application where it is disposed between two substrates, wherein solvent removal (e.g., evaporation) is restricted, especially when one or more of the substrates comprises a moisture impermeable material (e.g., steel or glass). In such cases, the polymeric material comprises a solids content of 90% or greater, 92% or greater, 94% or greater, 95% or greater, 96% or greater, 98% or greater, or 99% or greater. Likewise, in such embodiments where solvent removal is restricted, the first part, the second part, or both parts of a two-part composition according to the present disclosure comprises a solids content of 90% or greater, 92% or greater, 94% or greater, 95% or greater, 96% or greater, 98% or greater, or 99% or greater. Components that are considered "solids" include, for instance and without limitation, polymers, oligomers, monomers, hydroxyl-containing compounds, and additives such as plasticizers, catalysts, non-reactive diluents, and fillers. Typically, only solvents do not fall within the definition of solids, for instance water or organic solvents.

For convenient handleability, the polymeric material typically comprises a viscosity of 10,000 centiPoise (cP) or greater, 25,000 cP or greater, 50,000 cP or greater, 75,000 cP or greater, 100,000 cP or greater, 150,000 cP or greater, 200,000 cP or greater, 250,000 cP or greater, 300,000 cP or greater, 400,000 cP or greater, 500,000 cP or greater, 600,000 cP or greater, 700,000 cP or greater, or 800,000 cP or greater; and 11,000,000 cP, or less, 9,000,000 cP or less, 7,000,000 cP or less, 5,000,000 cP or less, 4,000,000 cP or less, 3,000,000 cP or less, 2,000,000 cP or less, or 1,000,000 cP or less, as determined using a parallel-plate geometry using steady flow mode using a shear rate of 1 second$^{-1}$ (1/s) at 25° C. Stated another way, the polymeric material may exhibit a dynamic viscosity of 10,000 cP to 11,000,000 cP, inclusive, 100,000 cP to 11,000,000 cP, inclusive, 100,000 cP to 5,000,000 cP, or 200,000 cP to 3,000,000 cP, inclusive, as determined using a parallel-plate geometry using steady flow mode using a shear rate of 1 1/s at 25° C. Further details regarding testing the viscosity are described in the Examples below.

Many thiol-containing compounds having at least two thiol groups (i.e., polythiols) are useful in two-part compositions according to the present disclosure. Useful polythiols are organic compounds having at least two (e.g., at least 2, at least 3, at least 4, or even at least 6) thiol groups. To achieve chemical crosslinking between polymer chains in the curable composition, at least one of the polythiol(s) have an average functionality of at least two. In some embodiments, the polythiol has an average thiol group functionality of 2.5 or greater, 2.75 or greater, 3 or greater, 3.25 or greater, 3.5 or greater, 3.75 or greater, or 4 or greater; and up to 6 average thiol group functionality.

In some embodiments, the polythiol is liquid (e.g., a viscous liquid having a viscosity of about 500-50,000 cP) at room temperature; however, this is not a requirement.

The polythiol can be an alkylene, arylene, alkylarylene, arylalkylene, or alkylenearylalkylene having at least two thiol groups, where any of the alkylene, alkylarylene, arylalkylene, or alkylenearylalkylene are optionally interrupted by one or more oxa (i.e., —O—), thia (i.e., —S—), or imino groups (i.e., —NR$^3$— wherein R$^3$ is a hydrocarbyl group or H), and optionally substituted by alkoxy or hydroxyl.

Exemplary useful dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethyl sulfide, methyl-substituted dimercaptodiethyl sulfide, dimethyl-substituted dimercaptodiethyl sulfide, dimercaptodioxaoctane, 1,5-dimercapto-3-oxapentane, benzene-1,2-dithiol, benzene-1,3-dithiol, benzene-1,4-dithiol, and tolylene-2,4-dithiol. Examples of polythiols having more than two thiol groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Also useful are polythiols formed from the esterification of polyols with thiol-containing carboxylic acids or their derivatives. Examples of polythiols formed from the esterification of polyols with thiol-containing carboxylic acids or their derivatives include those made from the esterification reaction between thioglycolic acid or 3-mercaptopropionic acid and several polyols to form the mercaptoacetates or mercaptopropionates, respectively.

Examples of polythiol compounds that may be preferred because of relatively low odor level include, but are not limited to, esters of thioglycolic acid, α-mercaptopropionic acid, and β3-mercaptopropionic acid with polyhydroxy compounds (polyols) such as diols (e.g., glycols), triols, tetrols, pentols, and hexols. Specific examples of such polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate) and ethoxylated versions, pentaerythritol tetrakis(thioglycolate), pentaerythritol tetrakis(β-mercaptopropionate), and tris(hydroxyethyl)isocyanurate tris(β-mercaptopropionate). However, in those applications where concerns about possible hydrolysis of the ester exists, these polyols are typically less desirable.

Suitable polythiols also include those commercially available as THIOCURE PETMP (pentaerythritol tetra(3-mercaptopropionate)), TMPMP (trimethylolpropane tri(3-mercaptopropionate)), ETTMP (ethoxylated trimethylolpropane tri(3-mercaptopropionate) such as ETTMP 1300 and ETTMP 700), GDMP glycol di(3-mercaptopropionate), TMPMA (trimethylolpropane tri(mercaptoacetate)), TEMPIC (tris[2-(3-mercaptopropionyloxy)ethyl]isocyanurate), and PPGMP (propylene glycol 3-mercaptopropionate) from Bruno Bock Chemische Fabrik GmbH & Co. KG. A specific example of a polymeric polythiol is polypropylene-ether glycol bis(β-mercaptopropionate), which is prepared from polypropylene-ether glycol (e.g., PLURACOL P201, Wyandotte Chemical Corp.) and p3-mercaptopropionic acid by esterification.

Suitable polythiols also include those preparable by esterification of polyols with thiol-containing carboxylic acids or their derivatives, those prepared from a ring-opening reaction of epoxides with H$_2$S (or its equivalent), those prepared from the addition of H$_2$S (or its equivalent)

across carbon-carbon double bonds, polysulfides, polythioethers, and polydiorganosiloxanes. Specifically, these include the 3-mercaptopropionates (also referred to as β-mercaptopropionates) of ethylene glycol and trimethylolpropane (the former from Chemische Fabrik GmbH & Co. KG, the latter from Sigma-Aldrich); POLYMERCAPTAN 805C (mercaptanized castor oil); POLYMERCAPTAN 407 (mercaptohydroxy soybean oil) from Chevron Phillips Chemical Co. LLP, and CAPCURE, specifically CAPCURE 3-800 (a polyoxyalkylenetriol with mercapto end groups, from Gabriel Performance Products, Ashtabula, Ohio, and GPM-800, which is equivalent to CAPCURE 3-800, also from Gabriel Performance Products.

Oligomeric or polymeric polythioether polythiols useful for practicing the present disclosure are also described in, for example, U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), and U.S. Pat. No. 6,509,418 (Zook et al.).

In some embodiments, the polythiol is oligomeric or polymeric. Examples of useful oligomeric or polymeric polythiols include polythioethers and polysulfides. Polythioethers include thioether linkages (i.e., —S—) in their backbone structures. Polysulfides include disulfide linkages (i.e., —S—S—) in their backbone structures.

Other useful polythiols can be formed from the addition of hydrogen sulfide ($H_2S$) (or its equivalent) across carbon-carbon double bonds. For example, dipentene and triglycerides which have been reacted with $H_2S$ (or its equivalent). Specific examples include dipentene dimercaptan and those polythiols available as POLYMERCAPTAN 358 (mercaptanized soybean oil) and POLYMERCAPTAN 805C (mercaptanized castor oil) from Chevron Phillips Chemical Co. LLP. At least for some applications, the preferred polythiols are POLYMERCAPTAN 358 and 805C since they are produced from largely renewable materials, i.e., the triglycerides, soybean oil and castor oil, and have relatively low odor in comparison to many thiols. Useful triglycerides have at least two sites of unsaturation, i.e., carbon-carbon double bonds, per molecule on average, and sufficient sites are converted to result in at least 2 thiols per molecule on average. In the case of soybean oil, this requires a conversion of approximately 42 percent or greater of the carbon-carbon double bonds, and in the case of castor oil this requires a conversion of approximately 66 percent or greater of the carbon-carbon double bonds. Typically, higher conversion is preferred, and POLYMERCAPTAN 358 and 805C can be obtained with conversions greater than approximately 60 percent and 95 percent, respectively. Useful polythiols of this type also include those derived from the reaction of $H_2S$ (or its equivalent) with the glycidyl ethers of bisphenol A epoxy resins, bisphenol F epoxy resins, and novolac epoxy resins. A preferred polythiol of this type is QX11, derived from bisphenol A epoxy resin, from Japan Epoxy Resins (JER) as EPOMATE. Other polythiols suitable include those available as EPOMATE QX10 and EPOMATE QX20 from JER.

Still other useful polythiols are polysulfides that contain thiol groups such as those available as THIOKOL LP-2, LP-3, LP-12, LP-31, LP-32, LP-33, LP-977, and LP-980 from Toray Fine Chemicals Co., Ltd., and polythioether oligomers and polymers such as those described in PCT Publ. No. WO 2016/130673 A1 (DeMoss et al.).

Useful polythiols can be formed from the addition of hydrogen sulfide ($H_2S$) across carbon-carbon double bonds. For example, dipentene and triglycerides which can be reacted with $H_2S$. Specific examples include dipentene dimercaptan and polythiols available as POLYMERCAPTAN 358 (mercaptanized soybean oil) and POLYMERCAPTAN 805C (mercaptanized castor oil) from Chevron Phillips Chemical Co. LLP.

In another method, polyenes can be prepared by combining polythiol(s) (e.g., dithiols) with polyene(s) (e.g., dienes) using a stoichiometric excess of the polythiol, resulting in an oligomeric polythiol.

In some embodiments, the polythiol has an average sulfhydryl group functionality of 2.5 or greater, 2.75 or greater, 3 or greater, 3.25 or greater, 3.5 or greater, 3.75 or greater, or 4 or greater; and up to 6 average sulfhydryl group functionality.

In some embodiments, the polythiol may include a primary thiol, a secondary thiol, or both.

In any embodiment, the polythiol may be present in the second part in an amount of 2% by weight or greater, based on the total weight of the second part, 3% by weight or greater, 4% by weight or greater, 5% by weight or greater, 6% by weight or greater, 7% by weight or greater, 8% by weight or greater, 9% by weight or greater, 10% by weight or greater, 11% by weight or greater, 12% by weight or greater, 13% by weight or greater, 14% by weight or greater, 15% by weight or greater, 17% by weight or greater, or 19% by weight or greater, based on the total weight of the second part; and 60% by weight or less, 55% by weight or less, 50% by weight or less, 45% by weight or less, 40% by weight or less, 35% by weight or less, 30% by weight or less, 25% by weight or less, or 20% by weight or less, based on the total weight of the second part. Stated another way, the amount of the polythiol present in the second part may range from 2 to 60% by weight, inclusive, 2 to 40% by weight, inclusive, or 5 to 30% by weight, inclusive, based on the total weight of the second part.

Preferably, the uretdione-containing material has an average isocyanate functionality of less than 0.1%.

The polymeric material needs to have enough of a uretdione group functionality per molecule of polymerized reaction product to allow for curing of a two-part composition into an effective polymer network when reacted with the polythiol. Typically, the polymerized reaction product comprises an average of 1.3 to 2.5 inclusive, of a uretdione functional group in a backbone of the polymerized reaction product. It is usually advantageous for the first part (e.g., the polymeric material and inorganic filler) to be flowable, (e.g., to allow for mixing with the second part) and to readily wet the surface of either a substrate to be coated or two substrates to be adhered.

In some embodiments, at least one of the first part or the second part further comprises an accelerator comprising a catalyst. Suitable accelerators (e.g., curatives and catalysts) are also described in detail above with respect to the first part. One or more of these accelerators can be useful in increasing the speed of reaction or catalyzing a reaction of components of the first part with the second part. For instance, the accelerator may be present in the first part and comprise a catalyst for reacting the uretdione-containing material with the first hydroxyl-containing compound and, if present, with the second hydroxyl-containing compound. Further, the accelerator may be present in at least one of the first part or the second part and comprise a catalyst for reacting with an optional epoxy component.

It has been discovered that it is possible to provide two-part compositions (according to at least certain embodiments of the present disclosure) that contain high inorganic filler loading (40% by weight or greater) and exhibit each of 1) workability; 2) acceptable extent of cure; 3) acceptable elongation; and optionally 4) thermal conductivity. Adhesive two-part compositions can further exhibit 5) acceptable adhesion strength following curing.

Preferably, the second part exhibits a dynamic viscosity comparable to that of the first part, namely 10,000 centiPoise (cP) or greater, 25,000 cP or greater, 50,000 cP or greater, 75,000 cP or greater, 100,000 cP or greater, 150,000 cP or greater, 200,000 cP or greater, 250,000 cP or greater, 300,000 cP or greater, 400,000 cP or greater, 500,000 cP or greater, 600,000 cP or greater, 700,000 cP or greater, or 800,000 cP or greater; and 11,000,000 cP, or less, 9,000,000 cP or less, 7,000,000 cP or less, 5,000,000 cP or less, 4,000,000 cP or less, 3,000,000 cP or less, 2,000,000 cP or less, or 1,000,000 cP or less, as determined using a parallel-plate geometry using steady flow mode using a shear rate of 1 second$^{-1}$ (1/s) at 25° C.

The uretdione-containing material is typically kept separate from the curing agent prior to use of the polymerizable composition. That is, the uretdione-containing material is typically in a first part and the accelerator is typically in a second part of the polymerizable composition. The first part can include other components that do not react with the uretdione-containing material (or that react with only a portion of the uretdione-containing material). Likewise, the second part can include other components that do not react with the accelerator or that react with only a portion of the accelerator.

Two-part compositions according to certain embodiments of the present disclosure use the basic chemical reaction from Scheme 3a or Scheme 3b below, e.g., a polymeric material comprising a uretdione-containing material and an (optional) reactive diluent (i.e., epoxy component or acrylate component) in one part of the system and a polythiol in the other part of the system. When the polythiol is mixed with the uretdione-containing material and the optional epoxy component, the thiol groups open the uretdione to form a thioallophanate and open the epoxy ring. This produces an isocyanate-free coating or adhesive system according to Scheme 3a:

When the polythiol is mixed with the uretdione-containing material and the optional acrylate component, the thiol groups open the uretdione to form a thioallophanate and reacts with a C=C bond of the acrylate component. This produces an isocyanate-free coating or adhesive system according to Scheme 3b:

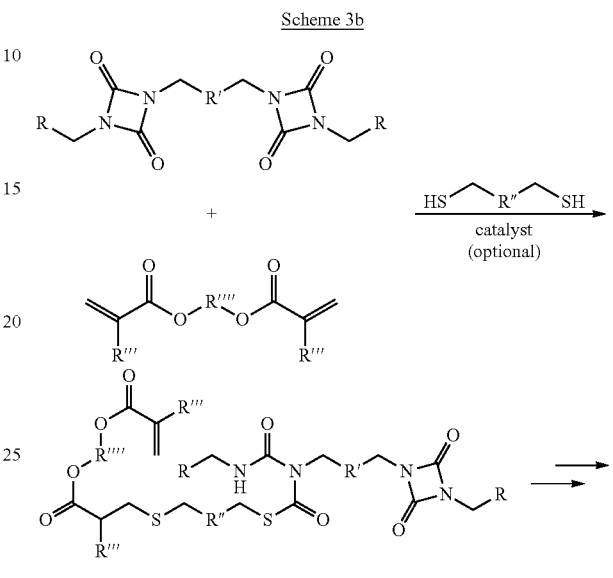

Scheme 3b

Advantageously, the reaction of thiol with epoxy, acrylate, and uretdione occur at similar rates forming a singular network. As such, the properties of the system trend from urethane-like to epoxy or acrylate-like with increasing epoxy or acrylate content.

The curable compositions of the present disclosure may be useful for coatings, shaped articles, adhesives (including structural and semi-structural adhesives), magnetic media, filled or reinforced composites, caulking and sealing com- Scheme 3a

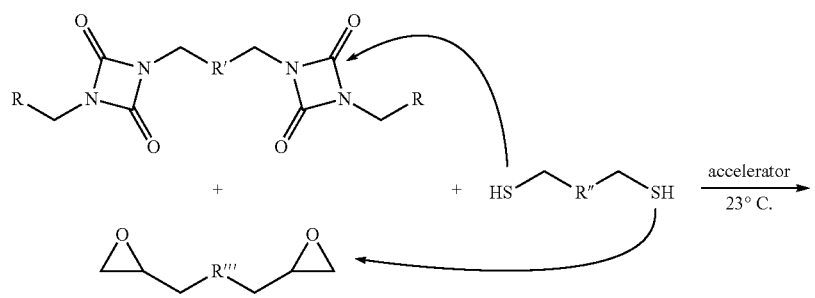

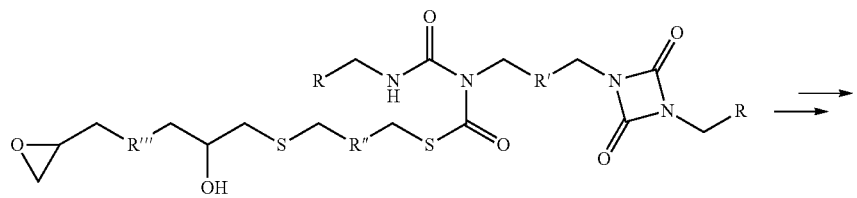

pounds, casting and molding compounds, potting and encapsulating compounds, impregnating and coating compounds, conductive adhesives for electronics, protective coatings for electronics, as primers or adhesion-promoting layers, and other applications that are known to those skilled in the art. In some embodiments, the present disclosure provides an article comprising a substrate, having a cured coating of the curable composition thereon.

In a second aspect, a polymerized product is provided. The polymerized product is the polymerized product of any of the two-part compositions according to the first aspect described above. The polymerized product typically coats at least a portion of a substrate, and up to the entire surface of a substrate depending on the application. When the polymerized product acts as an adhesive, often the polymerized product is disposed between two substrates (e.g., adhering the two substrates together). Advantageously, the polymerized product of at least some embodiments of the disclosure is suitable for use when at least one substrate comprises a moisture impermeable material, due to the high solids content of the polymerizable composition. Hence, in certain embodiments at least one substrate is made of a metal (e.g., steel), a glass, a wood, a ceramic, or a polymeric material. The polymerized product may also be employed with one or more substrates that have moisture permeability, for instance but without limitation, woven materials, nonwoven materials, paper, foams, membranes, and polymeric films.

Advantageously, polymerized products according to at least certain embodiments of the present disclosure exhibit desirable mechanical properties, such as at least one of a thermal conductivity of 0.5 W/m*K or greater, a tensile peak load of 0.25 megaPascals (MPa) or greater, a modulus of 500 MPa or less, or an elongation percent (%) of 5 or greater.

Generally, the particle size and loading levels of the inorganic particles are selected to provide a desired level of thermal conductivity in a polymerized product. In some embodiments, the thermal conductivity of the polymerized product (as determined by the test method described in the Examples) is at least 0.5 W/m*K. In some embodiments, the thermal conductivity of the polymerized product is at least 0.6, 0.7, 0.8, 0.9, 1.0, 1.1, 1.2, 1.3, 1.4, 1.5 1.6, 1.7, 1.8, 1.9, or 2.0 W/m*K. In some embodiments, the thermal conductivity of the polymerized product is no greater than 3.0, 2.9, 2.8, 2.7, 2.6, 2.5, 2.4, 2.3, 2.3, 2.1 or 2.0 W/m*K. Thermal conductivity can be determined using the method described in detail in the Examples.

In some embodiments, the polymerized product exhibits a tensile peak load of 0.30 MPa or greater, 0.35 MPa or greater, 0.40 MPa or greater, 0.45 MPa or greater, 0.50 MPa or greater, 0.55 MPa or greater, 0.60 MPa or greater, 0.65 MPa or greater, 0.70 MPa or greater, 0.75 MPa or greater, 0.80 MPa or greater, 0.85 MPa or greater, 0.90 MPa or greater, 0.95 MPa or greater, or 1.0 MPa or greater; and 3.0 MPa or less, 2.5 MPa or less, or 2.0 MPa or less. Tensile peak load can be determined using the method described in detail in the Examples.

In some embodiments, the polymerized product exhibits a modulus of or 450 MPa or less, 400 MPa or less, 350 MPa or less, 300 MPa or less, 250 MPa or less, 200 MPa or less, or 150 MPa or less; and 1 MPa or greater, 10 MPa or greater, or 30 MPa or greater. Young's modulus (E) can be determined using the method described in detail in the Examples.

In some embodiments, the polymerized product exhibits an elongation percent of 8 or greater, 10 or greater, 12 or greater, 15 or greater, 17 or greater, 20 or greater, 22 or greater, or 25 or greater; and an elongation % of 100 or less, 75 or less, 50 or less, or 25 or less. Elongation % can be determined using the method described in detail in the Examples.

It has been discovered that certain embodiments of the polymerized product according to the present disclosure exhibit both a thermal conductivity of 1 W/m*K or greater and an elongation percent of 50 or greater. This is unexpected at least because typically the extent of one of thermal conductivity or elongation percent has to be sacrificed to achieve a desired minimum amount of the other.

In some embodiments, the curable composition may function as a structural adhesive, i.e. the curable composition is capable of bonding a first substrate to a second substrate, after curing. Generally, the bond strength (e.g. peel strength, overlap shear strength, or impact strength) of a structural adhesive continues to build well after the initial cure time.

In a fifth aspect, a method of adhering two substrates is provided. Referring to FIG. 1, the method includes obtaining a two-part composition 110; combining at least a portion of the first part with at least a portion of the second part to form a mixture 120; disposing at least a portion of the mixture on a first major surface of a first substrate 130; and contacting a first major surface of a second substrate with the mixture disposed on the first substrate 140. The two-part composition includes (i) a first part including a polymeric material and (ii) a second part including at least one polythiol having an average sulfhydryl group functionality of 2 or greater.

Referring again to FIG. 1, the method optionally further comprises securing the first substrate to the second substrate (e.g., with one or more mechanical clamps, under a weighted object, etc.) and allowing the mixture to cure to form an adhesive adhering the first substrate and the second substrate together 150. The method optionally further comprises allowing the mixture to cure for at least 12 hours at ambient temperature to form an adhesive adhering the first substrate and the second substrate together 160. In contrast to some other available two-part compositions that are recommended to be allowed to cure for at least 24 hours (or at least 2 days, at least 4 days, at least 7 days, or at least 2 weeks), the present disclosure provides two-part compositions that are allowed to cure for 10 hours or more, 12 hours or more, 14 hours or more, 16 hours or more, or 18 hours or more; and up to 30 hours, up to 28 hours, up to 26 hours, up to 24 hours, up to 22 hours, or up to 20 hours. In some embodiments, the mixture of the first part and the second part is allowed to cure for 10 to 22 hours or 12 to 20 hours.

Stated another way, a method of adhering two substrates together comprises:
A) obtaining a two-part composition, the two-part composition comprising:
 1) a first part comprising a polymeric material comprising:
  c) a polymerized reaction product of a polymerizable composition comprising components, the components comprising:
   i) a uretdione-containing material comprising a reaction product of a diisocyanate reacted with itself,
   ii) a first hydroxyl-containing compound having more than one OH group; and
   iii) an optional second hydroxyl-containing compound having a single OH group, wherein the second hydroxyl-containing compound is a primary alcohol or a secondary alcohol; and d) 40% by weight or greater of an inorganic filler, based on the total weight of the polymeric material;

wherein the polymerized reaction product comprises a uretdione functionality of 1.3 to 2.5 and wherein the polymerized reaction product has a number average molecular weight (Mn) of 1100 grams per mole (g/mol) or greater; and 2) a second part comprising:
   a) a polythiol having an average sulfhydryl group functionality of 2 or greater; and
   b) 40% by weight or greater of an inorganic filler, based on the total weight of the second part;

B) combining at least a portion of the first part with at least a portion of the second part to form a mixture;

C) disposing at least a portion of the mixture on a first major surface of a first substrate; and D) contacting a first major surface of a second substrate with the mixture disposed on the first substrate.

Depending on the particular application, an amount of each of the first part and the second part obtained will vary; in certain embodiments, an excess of one or both of the first part and the second part is obtained and hence only a portion of one or both of the first part and the second part, respectively, will be combined to form a mixture. In other embodiments, however, a suitable amount of each of the first part and the second part for adhering the first and second substrates together is obtained and essentially all of the first part and the second part is combined to form the mixture. In certain embodiments, combining a (e.g., predetermined) amount of the first part with a (e.g., predetermined) amount of the second part is performed separately from the first and second substrates, while in other embodiments the combining is performed (e.g., directly) on the first major surface of a substrate.

The mixture is typically applied to (e.g., disposed on) the surface of the substrate using conventional techniques such as, for example, dispensing, bar coating, roll coating, curtain coating, rotogravure coating, knife coating, spray coating, spin coating, or dip coating techniques. Coating techniques such as bar coating, roll coating, and knife coating are often used to control the thickness of a layer of the mixture. In certain embodiments, the disposing comprises spreading the mixture on the first major surface of the first substrate, for instance when the mixture is dispensed (e.g., with a nozzle, etc.) on the surface of the substrate such that the mixture does not cover the entirety of a desired area.

The mixture may be coated onto substrates at useful thicknesses ranging from 5 microns to 10000 microns, 25 micrometers to 10000 micrometers, 100 micrometers to 5000 micrometers, or 250 micrometers to 1000 micrometers. Useful substrates can be of any nature and composition, and can be inorganic or organic. Representative examples of useful substrates include ceramics, siliceous substrates including glass, metal (e.g., aluminum or steel), natural and man-made stone, woven and nonwoven articles, polymeric materials, including thermoplastic and thermosets, (such as polymethyl (meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

Figure 2:
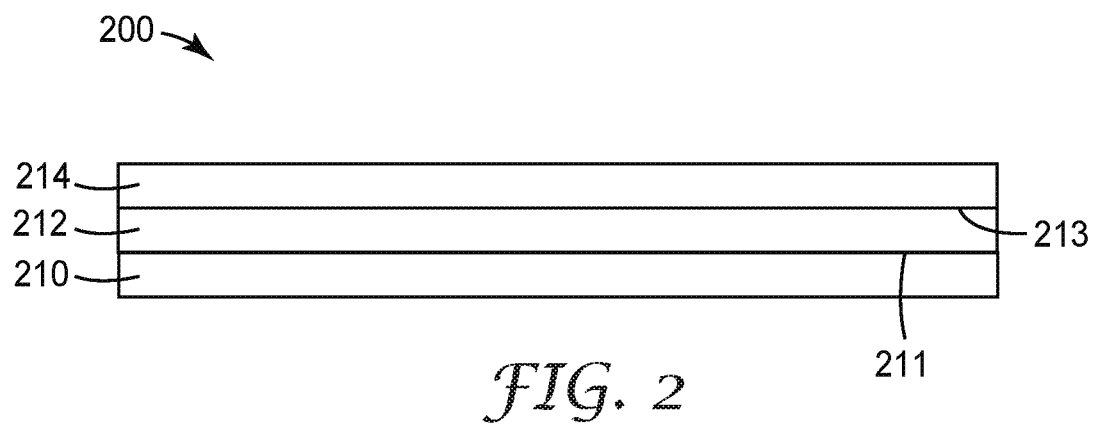
FIG. 2 is a schematic cross-sectional view of an exemplary article including two substrates adhered together, preparable according to the present disclosure.

Referring to FIG. 2, a schematic cross-section of an article 200 is illustrated. The article 200 comprises a mixture 212 (e.g., an adhesive) disposed on a first major surface 211 of a first substrate 210. The article 200 further comprises a first major surface 213 of a second substrate 214 in contact with (e.g., adhered to) the mixture 212 disposed on the first substrate 210.

Advantageously, the two-part compositions according to at least certain embodiments of the present disclosure are capable of providing at least a minimum adhesion of two substrates together. Following cure, the adhesive preferably exhibits a minimum overlap shear on aluminum of 0.3 megaPascals (MPa), 1 MPa, 5 MPa, 10 MPa, 12 MPa, 15 MPa, 20 MPa, 25 MPa, 30 MPa, 40 MPa, or 50 MPa. A suitable test for determining the minimum overlap shear is described in the Examples below.

In some embodiments, upon curing, the curable compositions of the present disclosure may exhibit thermal, mechanical, and rheological properties that render the compositions particularly useful as thermally conductive gap fillers. For example, it is believed that that curable compositions of the present disclosure provide an optimal blend of tensile strength, elongation at break, and overlap shear strength for certain EV battery assembly applications.

Figure 3:
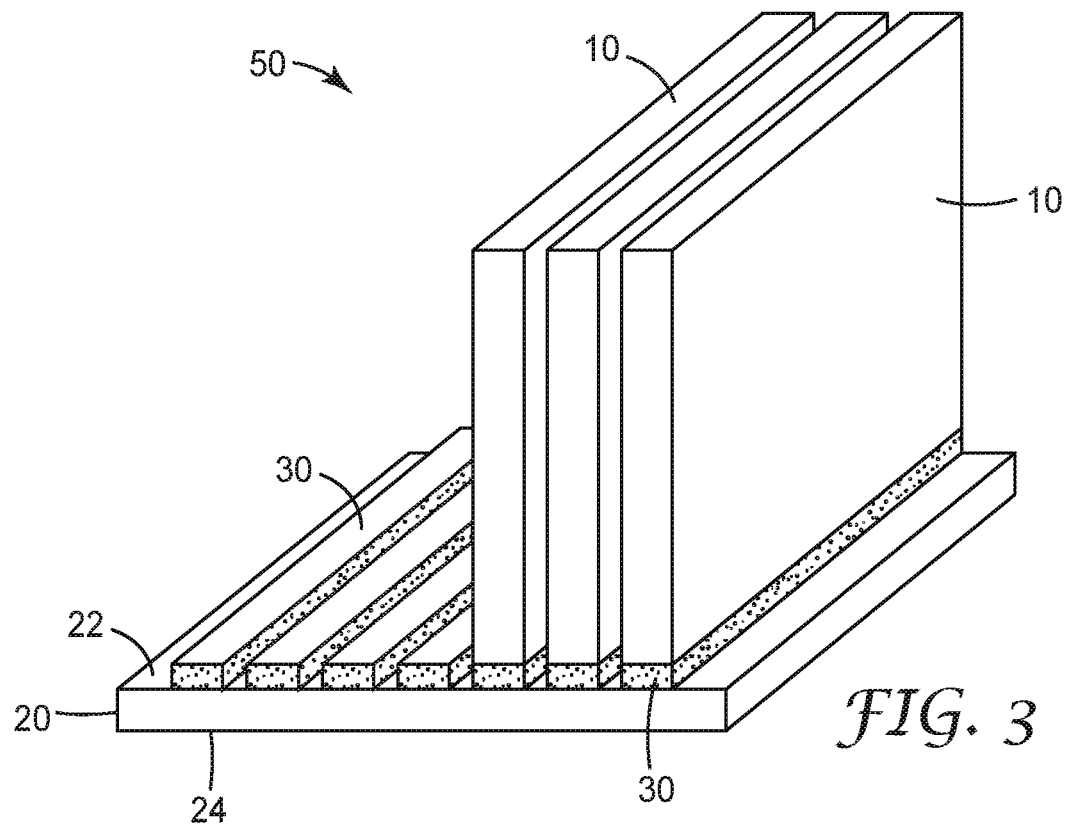
FIG. 3 illustrates the assembly of an exemplary battery module according to some embodiments of the present disclosure.
Figure 4:
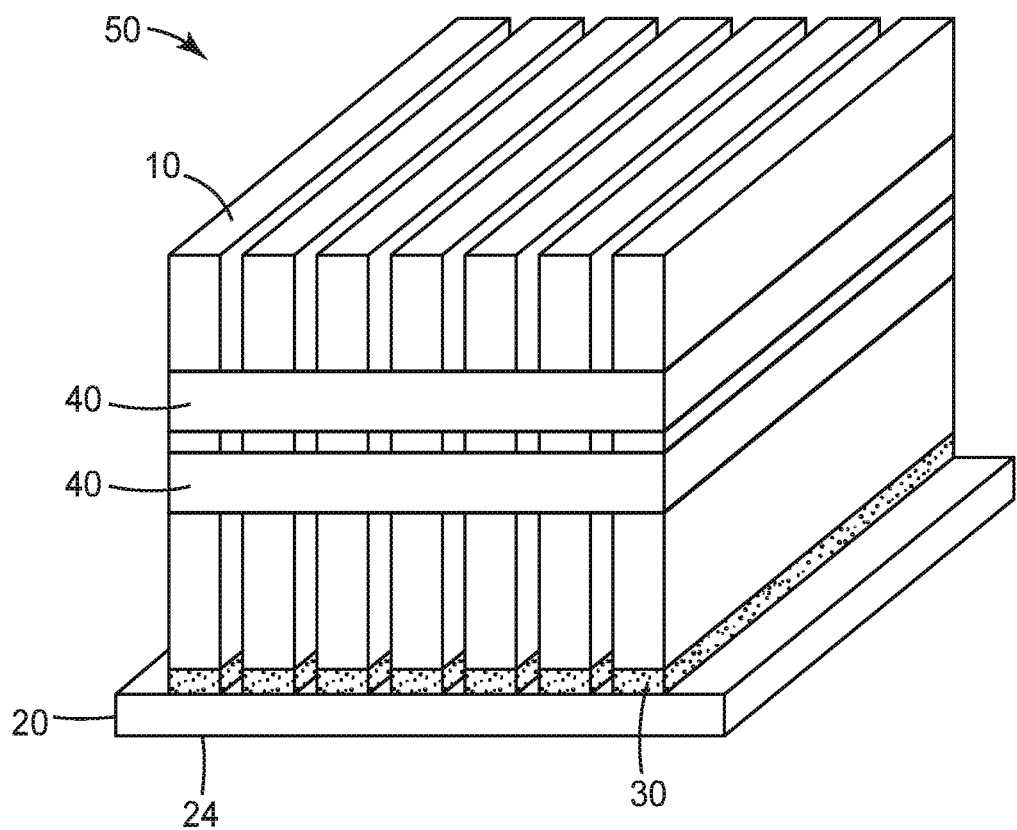
FIG. 4 illustrates the assembled battery module corresponding to FIG. 3.

In some embodiments, the present disclosure is further directed to a battery module that includes a polymerized product of any two-part composition according to the present disclosure. Components of a representative battery module during assembly are shown in FIG. 3, and an assembled battery module is shown in FIG. 4. The battery module 50 may be formed by positioning a plurality of battery cells 10 on a first base plate 20. Generally, any known battery cell may be used including, e.g., hard case prismatic cells or pouch cells. The number, dimensions, and positions of the cells associated with a particular battery module may be adjusted to meet specific design and performance requirements. The constructions and designs of the base plate are well-known, and any base plate (typically metal base plates made of aluminum or steel) suitable for the intended application may be used.

The battery cells 10 may be connected to the first base plate 20 through a first layer 30 of a polymerized product of a two-part composition according to any of the embodiments of the present disclosure. The first layer 30 of the polymerized product may provide first level thermal management where the battery cells are assembled in a battery module. As a voltage difference (e.g., a voltage difference of up to 2.3 Volts) is possible between the battery cells and the first base plate, breakthrough voltage may be an important safety feature for this layer. Therefore, in some embodiments, electrically insulating fillers like ceramics (typically alumina and boron nitride) may be preferred for use in the two-part compositions.

In some embodiments, the first layer 30 may comprise a discrete pattern of a mixture of at least a portion of the first part and the second part of the two-part composition applied to a first surface 22 of the first base plate 20, as shown in FIG. 3. For example, a pattern of the material to the desired lay-out of the battery cells may be applied, e.g., robotically applied, to the surface of the base plate. In some embodiments, the first layer may be formed as a coating of a mixture (of at least a portion of the first part and the second part of the two-part composition), covering all or substantially all of the first surface of the first base plate. In alternative embodiments, the first layer may be formed by applying a mixture (of the two parts of the two-part composition) directly to the battery cells and then mounting them to the first surface of the first base plate.

In some embodiments, the final polymerized product may need to accommodate dimensional variations of up to 2 mm, up to 4 mm, or even more. Therefore, in some embodiments, the first layer of the mixture may be at least 0.05 mm thick, e.g., at least 0.1 mm, or even at least 0.5 mm thick. Higher breakthrough voltages may require thicker layers depending on the electrical properties of the material, e.g., in some embodiments, at least 1, at least 2, or even at least 3 mm thick. Generally, to maximize heat conduction through the polymerized product and to minimize cost, the first layer should be as thin as possible, while still ensure good contact with the heat sink. Therefore, in some embodiments, the first layer is no greater than 5 mm thick, e.g., no greater than 4 mm thick, or even no greater than 2 mm thick.

As the mixture cures, the battery cells are held more firmly in-place. When curing is complete, the battery cells are finally fixed in their desired position, as illustrated in FIG. 4. Additional elements, such as bands 40 may be used to secure the cells for transport and further handling. Generally, it is desirable for curing to occur at typical application conditions, e.g., without the need for elevated temperatures or actinic radiation (e.g., ultraviolet light). In some embodiments, the mixture of the first part and the second part cures at room temperature, or no greater than 30° C., e.g., no greater than 25° C., or even no greater than 20° C.

Figure 5:
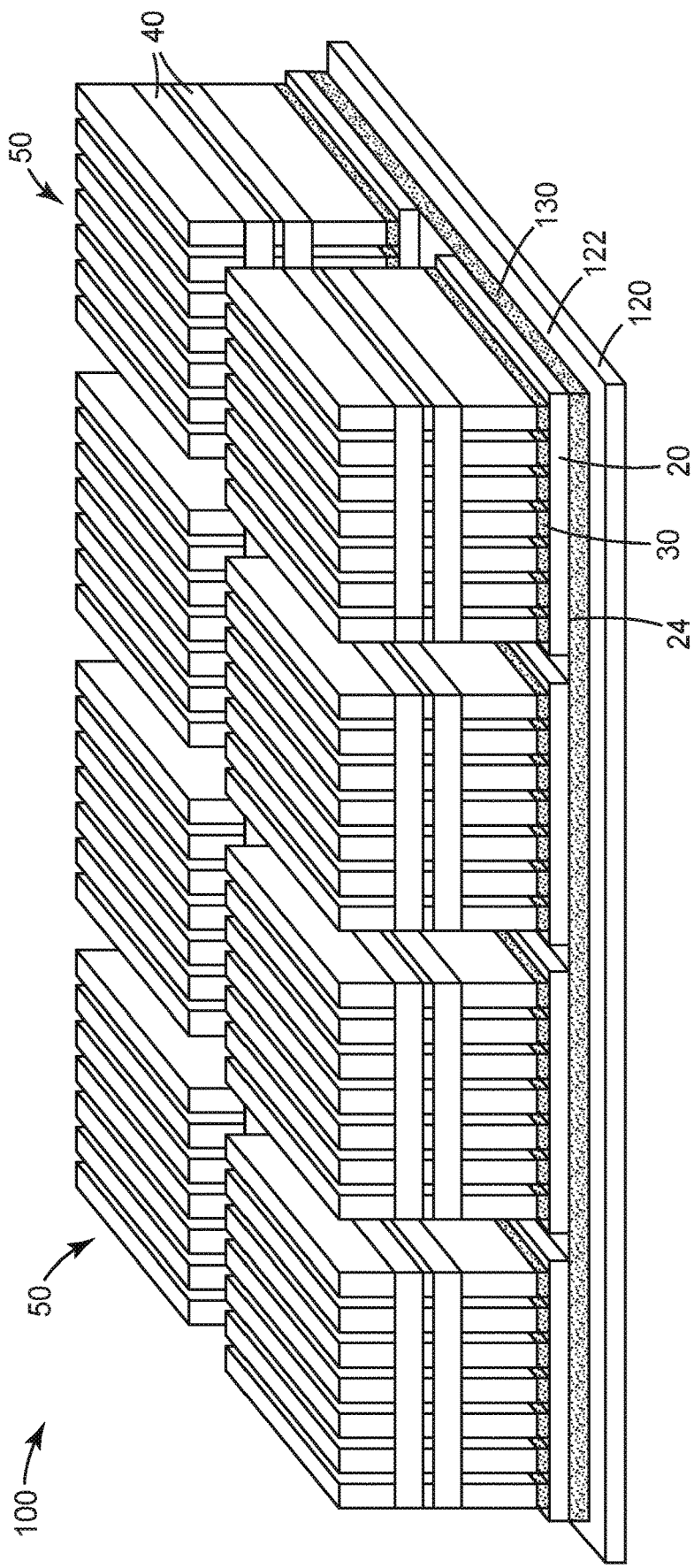
FIG. 5 illustrates the assembly of an exemplary battery subunit according to some embodiments of the present disclosure.

As shown in FIG. 5, a plurality of battery modules 50, such as those illustrated and described with respect to FIGS. 3 and 4, are assembled to form a battery subunit 100. The number, dimensions, and positions of the modules associated with a particular battery subunit may be adjusted to meet specific design and performance requirements. The constructions and designs of the second base plate are well-known, and any base plate (typically metal base plates) suitable for the intended application may be used. Individual battery modules 50 may be positioned on and connected to second base plate 120 through second layer 130 of a curable composition according to any of the embodiments of the present disclosure.

A second layer 130 of a second curable composition (e.g., a mixture of at least a portion of a first part and at least a portion of a second part of a two-part composition according to the present disclosure) may be positioned between the second surface 24 of the first base plate 20 (see FIGS. 3 and 4) and a first surface 122 of the second base plate 120. The second curable composition may provide second level thermal management where the battery modules are assembled into battery subunits. At this level, breakthrough voltage may not be a requirement. Therefore, in some embodiments, electrically conductive fillers such as graphite and metallic fillers may be used or alone or in combinations with electrically insulating fillers like ceramics.

In some embodiments, the second layer 130 may be formed as a coating of the second curable composition covering all or substantially all of the first surface 122 of second base plate 120, as shown in FIG. 5. In some embodiments, the second layer may comprise a discrete pattern of the second curable composition applied to the surface of the second base plate. For example, a pattern of the material corresponding to the desired layout of the battery modules may be applied, e.g., robotically applied, to the surface of the second base plate. In alternative embodiments, the second layer may be formed by applying the second curable composition directly to the second surface 24 of the first base plate 20 (see FIGS. 3 and 4) and then mounting the modules to the first surface 122 of the second base plate 120.

The assembled battery subunits may be combined to form further structures. For example, as is known, battery modules may be combined with other elements such as battery control units to form a battery system, e.g., battery systems used in electric vehicles. In some embodiments, additional layers of curable compositions according to the present disclosure may be used in the assembly of such battery systems. For example, in some embodiments, thermally conductive gap filler according to the present disclosure may be used to mount and help cool the battery control unit.

Select Embodiments of the Disclosure

In a first embodiment, the present disclosure provides a two-part composition. The two-part composition comprises 1) a first part comprising a polymeric material and 2) a second part comprising a polythiol having an average sulfhydryl group functionality of 2 or greater. The polymeric material comprises a polymerized reaction product of a polymerizable composition comprising components, the components comprising a) a uretdione-containing material comprising a reaction product of a diisocyanate reacted with itself, b) a first hydroxyl-containing compound having more than one OH group; and c) an optional second hydroxyl-containing compound having a single OH group, wherein the second hydroxyl-containing compound is a primary alcohol or a secondary alcohol. The polymerized reaction product comprises a uretdione functionality of 1.3 to 2.5 and the polymerized reaction product has a number average molecular weight (Mn) of 1100 grams per mole (g/mol) or greater. The polymeric material further comprises 40% by weight or greater of an inorganic filler, based on the total weight of the polymeric material. The second part also further comprises 40% by weight or greater of an inorganic filler, based on the total weight of the second part.

In a second embodiment, the present disclosure provides a two-part composition according to the first embodiment, wherein the inorganic filler of the first part, the second part, or both, comprises at least one of aluminum oxide, boron nitride, silicon dioxide, alumina trihydrate (ATH), aluminum nitride, silicon carbide, beryllium oxide, zinc oxide, carbon nanotubes, graphene, graphite, aluminum, or copper.

In a third embodiment, the present disclosure provides a two-part composition according to the first embodiment or the second embodiment, wherein the inorganic filler of the first part is present in an amount of 45% by weight or greater, based on the total weight of the polymeric material, 50% by weight or greater, 55% by weight or greater, 60% by weight or greater, 65% by weight or greater, 70% by weight or greater, 75% by weight or greater, or 80% by weight or greater, based on the total weight of the polymeric material; and 95% by weight or less, based on the total weight of the polymeric material, 90% by weight or less, or 85% by weight or less, based on the total weight of the polymeric material.

In a fourth embodiment, the present disclosure provides a two-part composition according to any of the first to third embodiments, wherein the inorganic filler of the first part is present in an amount of 30% by volume or greater, based on the total volume of the polymeric material, 35% by volume or greater, 40% by volume or greater, 45% by volume or greater; or 50% by volume or greater; and 70% by volume or less, based on the total volume of the polymeric material, 65% by volume or less, 60% by volume or less, or 55% by volume or less, based on the total volume of the polymeric material.

In a fifth embodiment, the present disclosure provides a two-part composition according to any of the first to fourth embodiments, wherein the polythiol is present in an amount of 2 to 60% by weight, 2 to 40% by weight, or 5 to 30% by weight, based on the total weight of the second part.

In a sixth embodiment, the present disclosure provides a two-part composition according to any of the first to fifth embodiments, wherein the polythiol comprises a primary thiol.

In a seventh embodiment, the present disclosure provides a two-part composition according to any of the first to sixth embodiments, wherein the polythiol comprises a secondary thiol.

In an eighth embodiment, the present disclosure provides a two-part composition according to any of the first to seventh embodiments, wherein the first hydroxyl-containing compound is an alkylene polyol, a polyester polyol, or a polyether polyol.

In a ninth embodiment, the present disclosure provides a two-part composition according to any of the first to eighth embodiments, wherein the polymerized reaction product comprises a uretdione functionality of 1.3 to 1.8, 1.5 to 2.0, 1.8 to 2.3, or 2.0 to 2.5.

In a tenth embodiment, the present disclosure provides a two-part composition according to any of the first to ninth embodiments, wherein the polymerized reaction product is present in an amount of 5% by weight or greater, based on the total weight of the polymeric material, 10% by weight or greater, 15% by weight or greater, 20% by weight or greater, 30% by weight or greater, 40% by weight or greater, or 50% by weight or greater, based on the total weight of the polymeric material; and 60% by weight or less or 55% by weight or less, based on the total weight of the polymeric material.

In an eleventh embodiment, the present disclosure provides a two-part composition according to any of the first to tenth embodiments, wherein the polymeric material further comprises a thixotropic agent.

In a twelfth embodiment, the present disclosure provides a two-part composition according to any of the first to eleventh embodiments, wherein the polymeric material further comprises a dispersant.

In a thirteenth embodiment, the present disclosure provides a two-part composition according to any of the first to twelfth embodiments, wherein the uretdione-containing material comprises a compound of Formula I:

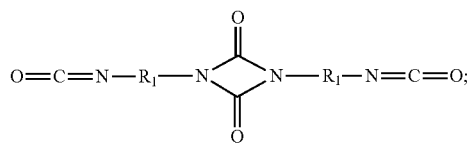

I wherein $R_1$ is independently a $C_4$ to $C_{14}$ alkylene, arylene, and alkaralyene.

In a fourteenth embodiment, the present disclosure provides a two-part composition according to any of the first to thirteenth embodiments, wherein the second hydroxyl-containing compound is present and is of Formula VII:

$R_{13}$—OH    VII;

wherein $R_{13}$ is selected from $R_{14}$, $R_{15}$, and a $C_1$ to $C_{50}$ alkyl;

wherein $R_{14}$ is of Formula VIII:

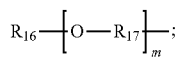

VIII wherein m=1 to 20, $R_{16}$ is an alkyl, and $R_{17}$ is an alkylene; wherein $R_{15}$ is of Formula IX:

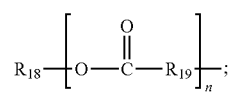

IX wherein n=1 to 20, $R_{18}$ is an alkyl, and $R_{19}$ is an alkylene.

In a fifteenth embodiment, the present disclosure provides a two-part composition according to any of the first to fourteenth embodiments, wherein the first hydroxyl-containing compound is of Formula II:

HO—$R_2$—OH    II;

wherein $R_2$ is selected from $R_3$, an alkylene, and an alkylene substituted with an OH group, wherein $R_3$ is of Formula III or Formula IV:

III

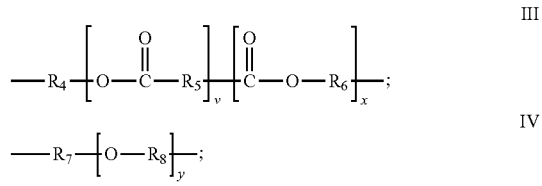

IV wherein each of $R_4$, $R_5$, $R_6$, $R_7$, and $R_8$ is independently an alkylene, wherein each of v and y is independently 1 to 40, and wherein x is selected from 0 to 40.

In a sixteenth embodiment, the present disclosure provides a two-part composition according to the fifteenth embodiment, wherein $R_2$ is selected from a $C_1$ to $C_{20}$ alkylene and a $C_1$ to $C_{20}$ alkylene substituted with an OH group.

In a seventeenth embodiment, the present disclosure provides a two-part composition according to the fifteenth embodiment or sixteenth embodiment, wherein each of $R_4$, $R_5$, $R_6$, $R_7$, and $R_8$ is independently a $C_1$ to $C_{20}$ alkylene.

In an eighteenth embodiment, the present disclosure provides a two-part composition according to any of the first to seventeenth embodiments, wherein the first hydroxyl-containing compound is a polypropylene glycol polyol or a poly(tetramethylene ether) glycol.

In a nineteenth embodiment, the present disclosure provides a two-part composition according to the eighteenth embodiment, wherein the first hydroxyl-containing compound has a number average molecular weight of 500 to 4,000 g/mol, inclusive, 650-3,000 g/mol, inclusive, or 1,000-2,100 g/mol, inclusive.

In a twentieth embodiment, the present disclosure provides a two-part composition according to any of the first to fourteenth embodiments, the eighteenth embodiment, or the nineteenth embodiment, wherein the first hydroxyl-containing compound is of Formula V or Formula VI:

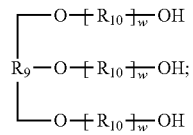

V

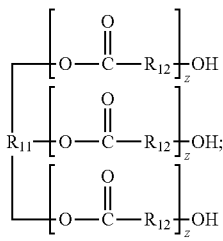

wherein each of $R_9$ and $R_{11}$ is independently an alkanetriyl, wherein each of $R_{10}$ and $R_{12}$ is independently an alkylene and wherein each of w and z is independently 1 to 20.

In a twenty-first embodiment, the present disclosure provides a two-part composition according to the twentieth embodiment, wherein each of $R_{10}$ and $R_{12}$ is independently a $C_1$ to $C_{20}$ alkylene.

In a twenty-second embodiment, the present disclosure provides a two-part composition according to any of the first to twenty-first embodiments, wherein the polymeric material further comprises at least one epoxy component.

In a twenty-third embodiment, the present disclosure provides a two-part composition according to the twenty-second embodiment, wherein the epoxy component is present in an amount of 2 to 45% by weight, 5 to 30% or 10 to 25% by weight, based on the total weight of the polymeric material.

In a twenty-fourth embodiment, the present disclosure provides a two-part composition according to the twenty-second embodiment or the twenty-third embodiment, wherein the polymeric material further comprises an accelerator including a catalyst for reacting with the epoxy component.

In a twenty-fifth embodiment, the present disclosure provides a two-part composition according to any of the first to twenty-fourth embodiments, wherein the polymeric material further comprises at least one acrylate component.

In a twenty-sixth embodiment, the present disclosure provides a two-part composition according to any of the first to twenty-fifth embodiments, wherein the polymeric material further comprises an accelerator including a catalyst.

In a twenty-seventh embodiment, the present disclosure provides a two-part composition according to the twenty-sixth embodiment, wherein the accelerator comprises a catalyst for reacting the uretdione-containing material with the first hydroxyl-containing compound and, if present, with the second hydroxyl-containing compound.

In a twenty-eighth embodiment, the present disclosure provides a two-part composition according to the twenty-seventh embodiment, wherein the catalyst comprises a bismuth carboxylate.

In a twenty-ninth embodiment, the present disclosure provides a two-part composition according to the twenty-eighth embodiment, wherein the bismuth carboxylate is bismuth neodecanoate or bismuth ethylhexanoate.

In a thirtieth embodiment, the present disclosure provides a two-part composition according to any of the first to twenty-ninth embodiments, wherein the polymeric material comprises 10% by weight or greater, based on the total weight of the polymeric material, of inorganic filler having an average particle size of 30 micrometers or greater, 40 micrometers or greater, or 50 micrometers or greater.

In a thirty-first embodiment, the present disclosure provides a two-part composition according to any of the first to thirtieth embodiments, wherein the inorganic filler of the first part, the second part, or both, comprises a combination of smaller and larger particles.

In a thirty-second embodiment, the present disclosure provides a two-part composition according to any of the first to thirty-first embodiments, wherein the polymeric material is in the form of a liquid.

In a thirty-third embodiment, the present disclosure provides a two-part composition according to any of the first to thirty-second embodiments, wherein the polymeric material has a solids content of 94% or greater or 98% or greater.

In a thirty-fourth embodiment, the present disclosure provides a two-part composition according to any of the first to thirty-third embodiments, wherein the polymeric material exhibits a viscosity of 10,000 centiPoise (cP) or greater, 25,000 cP or greater, 50,000 cP or greater, 75,000 cP or greater, 100,000 cP or greater, 150,000 cP or greater, 200,000 cP or greater, 250,000 cP or greater, 300,000 cP or greater, 400,000 cP or greater, 500,000 cP or greater, 600,000 cP or greater, 700,000 cP or greater, or 800,000 cP or greater; and 11,000,000 cP or less, 9,000,000 cP or less, 7,000,000 cP or less, 5,000,000 cP or less, 4,000,000 cP or less, 3,000,000 cP or less, 2,000,000 cP or less, or 1,000,000 cP or less, as determined using a parallel-plate geometry using steady flow mode and a shear rate of 1 l/s at 25° C.

In a thirty-fifth embodiment, the present disclosure provides a polymerized product of the two-part composition according to any of the first to thirty-fourth embodiments.

In a thirty-sixth embodiment, the present disclosure provides a polymerized product of the thirty-fifth embodiment, exhibiting at least one of an overlap shear to aluminum of 1 MPa or greater at 140° C., a thermal conductivity of 0.5 W/m*K or greater, a tensile peak load of 0.25 MPa or greater, a modulus of 500 MPa or less, or an elongation percent of 5 or greater.

In a thirty-seventh embodiment, the present disclosure provides a battery module. The battery module comprises a plurality of battery cells connected to a base plate by a layer of the polymerized product of the thirty-fifth embodiment or the thirty-sixth embodiment.

In a thirty-eighth embodiment, the present disclosure provides a method of adhering two substrates together. The method comprises A) obtaining a two-part composition; B) combining at least a portion of the first part with at least a portion of the second part to form a mixture; C) disposing at least a portion of the mixture on a first major surface of a first substrate; and D) contacting a first major surface of a second substrate with the mixture disposed on the first substrate. The two-part composition comprises 1) a first part comprising a polymeric material and 2) a second part comprising a polythiol having an average sulfhydryl group functionality of 2 or greater. The polymeric material comprises a polymerized reaction product of a polymerizable composition comprising components, the components comprising a) a uretdione-containing material comprising a reaction product of a diisocyanate reacted with itself; b) a first hydroxyl-containing compound having more than one OH group; and c) an optional second hydroxyl-containing compound having a single OH group, wherein the second hydroxyl-containing compound is a primary alcohol or a secondary alcohol. The polymerized reaction product comprises a uretdione functionality of 1.3 to 2.5 and the polymerized reaction product has a number average molecular weight (Mn) of 1100 grams per mole (g/mol) or greater. The polymeric material further comprises 40% by weight or greater of an inorganic filler, based on the total weight of the polymeric material. The second part also further comprises 40% by weight or greater of an inorganic filler, based on the total weight of the second part.

Examples

Unless otherwise noted or readily apparent from the context, all parts, percentages, ratios, etc. in the Examples and the rest of the specification are by weight. Table 1 (below) lists materials used in the examples and their sources. In the Tables, "NA" means not applicable. In the examples: EX—designates working examples, CEX—designates comparative examples, and PEX—designates preparative examples.

TABLE 1

| DESIGNATION | DESCRIPTION | SOURCE |
| --- | --- | --- |
| DN3400 | HDI-based oligomer with uretdione functional groups obtained as DESMODUR N3400 | Covestro, Leverkusen, Germany |
| 2-BuOH | 2-Butanol | Alfa Aesar, Ward Hill, MA |
| NPG | 2,2-dimethyl-1,3-propanediol | Alfa Aesar |
| BiND | bismuth neodecanoate | Gelest, Morrisville, PA |
| T650 | Poly(tetramethylene ether) glycol with a molecular weight of 650 g/mol obtained under the trade designation TERATHANE 650 | Invista, Wichita, KS |
| PPG 2000 | Poly(propylene glycol), average Mn ~2,000 | Alfa Aesar |
| EPON 828 | BPA Epoxy solution obtained under the trade designation EPON 828 | Hexion Inc., Columbus, OH |
| Moldx A110 | Alumina Trihydrate (ATH) Thermally Conductive Filler | Huber Engineered Materials, Atlanta, GA |
| BAK40 | BAK-40 Spherical Alumina | Bestry Performance Materials, Shanghai, China |
| MARTOXID TM-1250 | Aluminum Oxide Thermally Conductive Filler | Huber Engineered Materials |
| MARTOXID TM-2250 | Aluminum Oxide Thermally Conductive Filler | Huber Engineered Materials |
| D145 | DISPERBYK 145, Dispersing Additive | BYK-Chemie, Wesel, Germany |
| TMPTA | Trimethylolpropane triacrylate | Sartomer, Exton, PA |
| Araldite PY 4122 | Bisphenol type epoxy resin | Huntsman, The Woodlands, TX |
| Hypox UA10 | HyPox UA10 is a standard Bisphenol A epoxy resin which has been modified with a select thermoplastic polyurethane | Emerald Performance Materials, Vancouver, WA |
| Hypox UA11 | HyPox UA11 is a standard Bisphenol A epoxy resin which has been modified with a select thermoplastic polyurethane (TPU) and a reactive flexibilizing modifier | Emerald Performance Materials |
| EGE31 | Triglycidyl ether of trimethylolethane obtained under the trade designation ERISYS GE-31 | Emerald Performance Materials |
| AK54 | 2,4,6-Tris-(dimethylaminomethyl) phenol obtained under the trade designation ANCAMINE K54 | TCI America, Portland, OR |
| PETMP | Pentaerythritol tetrakis(3-mercaptopropionate) (tetrafunctional thiol curative) | TCI America |
| DMDO | 3,6-Dioxa-1,8-octane-dithiol (difunctional thiol curative) | TCI America |
| TMPTMP | Trimethylolpropane Tri(3-mercaptopropionate) (Triunctional Thiol Curative) | TCI America |
| KARENZ PE1 | Multifunctional thiol obtained under the trade designation KARENZ MT PEI | Showa Denko America, Inc., New York, NY |
| GPM 800 | A mercaptan-terminated polymer used as a liquid curing agent sold under the tradename GABEPRO GPM-800 | Gabriel Performance Products, Akron, OH |
| D510 | A 100% active polymeric dispersant which will improve dispersion and stability sold under the trade name SOLPLUS | Lubrizol, Wickliffe, OH |

TABLE 1-continued

| DESIGNATION | DESCRIPTION | SOURCE |
| --- | --- | --- |
| A-189 | A gamma-mercaptopropyltrimethoxysilane sold under the trade name SILQUEST A-189 | Momentive Specialty Chemicals, Inc., Waterford, NY |
| D1189 | A bifunctional silane sold under the trade name DYNASYLAN 1189 | Evonik Industries AG, Essen, Germany |

Test Methods
FTIR Characterization

The infrared (IR) spectra of the polymerized reaction product samples and the cured adhesives were obtained using an infrared Fourier transform spectrometer (Nicolet 6700 FT-IR Spectrometer, Thermo Scientific, Madison, Wis.) equipped with a Smart iTR Diamond Attenuated Total Reflectance (ATR) accessory. For all the polymerized reaction products the isocyanate peak at 2260 cm$^{-1}$ was not present in the infrared spectrum, indicating that the isocyanate had reacted completely with the alcohols during the preparation of the polymerized reaction products. For all the products, a strong uretdione signal at 1760 cm$^{-1}$ was observed.

NMR Analysis of DN3400

DN3400 was dissolved in deuterated dimethyl sulfoxide (DMSO) solvent. The $^1$H proton spectrum was taken with a 500 MHz NMR (AVANCE III 500 MHz spectrometer equipped with a broadband cryoprobe from Bruker, Billerica, Mass.). The resulting spectrum had 5 major signals. Signals at 1.31 parts per million (ppm) and 1.55 ppm were attributed to methylene groups at the 3 and 4 positions and the 2 and 5 positions of the HDI derivatives, respectively. A signal at 3.17 ppm was attributed to methylene protons adjacent to a uretdione group. A signal at 3.34 ppm was attributed to methylene protons adjacent to an isocyanate group. A signal at 3.74 ppm was attributed to methylene protons adjacent to an isocyanurate group. The integrations of these three methylene signals were 1.35, 1.79, and 0.49, respectively. The published values for DN3400 are an equivalent weight of isocyanate of 193 g/equivalent and 22 weight percent isocyanate. The ratio of the integration of the signal at 3.17 ppm over the integration of the signal at 3.34 ppm is 0.75, which corresponds to 16 wt. % uretdione. The ratio of the integration of the signal at 3.74 ppm over the integration of the signal at 3.34 ppm is 0.27, which corresponds to 3 wt. % isocyanurate. The functionality of DN3400 is published as 2.5 (in "Raw Materials for Automotive Refinish Systems" from Bayer Materials Science, 2005), so the average molecular weight of the molecule in DN3400 is 193 grams/equivalent×2.5 equivalents/mole=482 grams/mol. For every 2.5 isocyanate methylene groups, there are 0.75*2.5=1.875 uretdione methylene groups. There are two methylene groups per uretdione group, so there are about 0.94 uretdione groups per molecule of DN3400.

Calculation of Uretdione Functionality in Polymeric Materials

A modified Carothers equation relates degree of polymerization (DP) to the average functionality (fav) and conversion (p) in a step growth polymerization [Carothers, Wallace, "Polymers and Polyfunctionality", Transactions of the Faraday Society, 1936, vol. 32, pp 39-49]:

$$DP=2/(2-pfav)$$

This equation can be used to calculate the average degree of polymerization of each reaction product. Based on the degree of polymerization, the average number of uretdione groups in the polymerized reaction product (fUD) can be calculated by:

$$f(UD)=DP*(DN3400 \text{ molecules})*(\text{uretdione groups per DN3400 molecule})/(\text{total molecules})$$

where the values for "DN3400 molecules" and the "total molecules" correspond to the respective moles of molecules used to make the polymerized reaction product, and the value for "uretdione groups per DN3400 molecule" is 0.94, as calculated based on the NMR data (above).

General Polymerized Reaction Product Preparation

Bismuth neodecanoate, DN3400 (HDI-based uretdione-containing material obtained as DESMODUR N3400 from Covestro), the chain extender, and the capping group were added to a glass jar according to Table 2. The amounts of alcohol that were added correspond to the equivalent values in Tables 2 to 3 (relative to the equivalents of isocyanate). The mixture was stirred magnetically at 700 RPM. Initially the mixture was hazy, and after about one minute, the mixture became clear and slightly warm. The mixture then continued to exotherm noticeably. Stirring was continued for a total of 5 minutes, and the polymerized reaction product was then allowed to cool to room temperature. Reaction progress was monitored by IR. If isocyanate was still present after 18 hours, the reaction was warmed to 80° C. for 1 hour intervals until it was consumed.

The calculated uretdione functionality and number average molecular weight of each formulation are summarized in Table 2. The calculated number average molecular weight was calculated by dividing the total weight in grams by the number of molecules. The reactions were conducted at an index of 1 and assumed to go to completion. Therefore the number of molecules present at the end of the reaction was calculated to be the total number of molecules present at the start, less the equivalents of isocyanate. The amount of isocyanate was determined utilizing the published information for DN3400.

Overlap Shear Test Method

The performance of adhesives derived from uretdione-containing polymerized reaction products was determined using overlap shear tests. Aluminum coupons (25 mm×102 mm×1.6 mm) were sanded with 220 grit sandpaper and wiped with isopropanol and dried. Part A and Part B were both added to a speedmix cup and mixed for 45 seconds to 90 seconds using a speed mixer (DAC 150 FV SpeedMixer from FlackTek, Landrum, S.C.). The mixture was mixed for 15 to 30 seconds using a combination of hand mixing with a wood applicator stick and the speed mixer, if needed. The mixture was then applied to a 25 mm×13 mm area on one end of the aluminum coupon, and two pieces of stainless steel wire (0.25 mm diameter) were placed in the resin to act as bondline spacers. One end of a second aluminum coupon was then pressed into to the mixture to produce an overlap of approximately 13 mm. A binder clip was placed on the sample, and it was allowed to cure for at least 18 hours. The samples were tested to failure in shear mode at a rate of 2.54 mm/minute using a tensile load frame with self-tightening grips (MTS Systems, Eden Prairie, Minn.). After failure, the length of the overlap area was measured. The overlap shear value was then calculated by dividing the peak load by the overlap area.

The measured OLS values are summarized in Table 5.

Tensile Properties

For tensile tests, dogbone-shaped samples were made by pressing the mixed paste of Part A and B into a dogbone-shaped silicone rubber mold, which was then laminated with release liner on both sides. The dogbone shape gives a sample with a length of about 0.6 inch in the center straight area, a width of about 0.2 inch in the narrowest area, and a thickness of about 0.06-0.1 inch. Samples were then cured at room temperature for at least 24 hours to be fully cured prior to tensile testing.

Tensile tests were conducted on an MTS according to ASTM D638-03, "Standard Test Method for Tensile Properties of Plastics." The crosshead speed was 2.0 inch/min.

The measured tensile values are summarized in Table 5.

Thermal Conductivity

For thermal conductivity measurements, disk-shaped samples were made by pressing the mixed paste into a disk-shaped silicone rubber mold which was then laminated with release liner on both sides. The disk shape gives samples with a diameter of 12.6 mm and a thickness of 2.2 mm. The sample was then cured at room temperature for 24 hours, room temperature for 15 hours, or 100° C. for 1 hour to give complete curing.

Specific heat capacity, $C_p$, was measured using a Q2000 Differential Scanning Calorimeter (TA Instruments, Eden Prairie, Minn., US) with sapphire as a method standard.

Sample density was determined using a geometric method. The weight (m) of a disk-shaped sample was measured using a standard laboratory balance, the diameter (d) of the disk was measured using calipers, and the thickness (h) of the disk was measured using a Mitatoyo micrometer. The density, ρ, was calculated by $\rho=m/(\pi \cdot h \cdot (d/2)^2)$.

Thermal diffusivity, α(T), was measured using an LFA 467 HYPERFLASH Light Flash Apparatus (Netzsch Instruments, Burlington, Mass., US) according to ASTM E1461-13, "Standard Test Method for Thermal Diffusivity by the Flash Method."

Thermal conductivity, k, was calculated from thermal diffusivity, heat capacity, and density measurements according the formula: $k=\alpha \cdot C_p \cdot \rho$ where k is the thermal conductivity in W/(m K), α is the thermal diffusivity in mm²/s, $C_p$ is the specific heat capacity in J/K-g, and ρ is the density in g/cm³.

The measured Thermal Conductivity measurements are summarized in Table 6.

Dielectric Breakdown Strength

Dielectric breakdown strength measurements were performed according to ASTM D149-09(2013), "Standard Test Method for Dielectric Breakdown Voltage and Dielectric Strength of Solid Electrical Insulating Materials at Commercial Power Frequencies" using a Model 6TC4100-10/50-2/D149 Automated Dielectric Breakdown Test Set (Phenix Technologies, Accident, Md., US) that is specifically designed for testing DC breakdown from 3-100 kV and AC breakdown in the 1-50 kV, 60 Hz range. Each measurement was performed while the sample was immersed in FLUORINERT FC-40 fluid (3M Corporation, Saint Paul, Minn., US). The average breakdown strength was based on an average of measurements up to 10 or more samples. As is typical, a frequency of 60 Hz and a ramp rate of 500 volts per second was utilized for these tests.

The measured values for Dielectric Breakdown Strengths are summarized in Table 6.

Electrical Resistivity

Volume resistivity was measured with a Model 6517A Electrometer (Keithley Instruments, Cleveland, Ohio, US) with 100 femtoAmp resolution and an applied voltage of 500 Volts, according to the procedures in to ASTM D257-14, "Standard Test Methods for DC Resistance or Conductance of Insulating Materials." A Keithley Model 8009 Resistivity test fixture was used with compressible conductive rubber electrodes and 1 lb (0.45 kg) electrode force over approximately 2.5 inches (6.35 centimeters) of electrode and sample. The samples were approximately 18 mils (457.2 micrometers) thick. The corresponding detection threshold for surface resistivity is approximately 1017 ohms. Each sample was measured once, and an electrification time of 60 seconds was employed. A high resistance sample PTFE, a low resistance sample (bulk loaded carbon in Kapton), and a moderate resistance sample (paper) were used as material reference standards.

The measured values for Electrical Resistivity are summarized in Table 6.

Rheology

Viscosity was measured using a 25 mm parallel-plate geometry on a Discovery HR-3 Rheometer (TA Instruments, Wood Dale, Ill., US) equipped with a forced convection oven accessory, using steady flow mode with shear rate sweep from 0.001 l/s to 100 l/s at 25° C. Results are provided in units of centipoise (cP).

Viscosity measurements are detailed in Tables 4.

Preparing Part A

Thiol curatives, filler, and dispersant were added (according to the formulations in Table 3) to a plastic cup and mixed at 2700-3500 revolutions per minute (RPM) for 45 seconds to 90 seconds using a speed mixer (DAC 150 FV Speed-Mixer from FlackTek, Landrum, S.C.).

Preparing Part B

The uretdione polymerized reaction product, filler, epoxy, acrylate, and dispersant were added (according to the formulations in Table 4) to a plastic cup and mixed at 2700-3500 revolutions per minute (RPM) for 45 seconds to 90 seconds using a speed mixer (DAC 150 FV SpeedMixer from FlackTek, Landrum, S.C.).

The Part A and B mixtures were combined according to the values in Table 5 and were tested for overlap shear (OLS) according to the Overlap Shear Test Method, and tensile methods described above.

TABLE 2

| PREPARATIVE EXAMPLE | Capping Group | | | Chain Extender 1 | | | Chain Extender 2 | | | BiND DN3400, g | CATALYST, g | URETDIONE FUNCTIONALITY (Mn) |
|---|---|---|---|---|---|---|---|---|---|---|---|---|
| | Type | G | Relative equiv. | Type | g | Relative equiv. | Type | g | Relative equiv. | | | |
| PEX-1 | 2-BuOH | 19.5 | 0.58 | NPG | 5.58 | 0.23 | PPG 2000 | 86.4 | 0.19 | 88.2 | 0.24 | 2.0 (2330) |

TABLE 2-continued

| PREPARATIVE EXAMPLE | Capping Group | | | Chain Extender 1 | | | Chain Extender 2 | | | BiND DN3400, g | URETDIONE CATALYST, g | FUNCTIONALITY (Mn) |
|---|---|---|---|---|---|---|---|---|---|---|---|---|
| | Type | G | Relative equiv. | Type | g | Relative equiv. | Type | g | Relative equiv. | | | |
| PEX-2 | 2-BuOH | 12.3 | 0.58 | NPG | 5.01 | 0.34 | T650 | 8.0 | 0.09 | 55.4 | 0.15 | 1.99 (1490) |

TABLE 3

| PREPARATIVE EXAMPLE | THIOL | g | THIOL | g | CATALYST | g | ADHEION PROMOTER | g | TM 720, g | TM22 50, g | BAK 40, g | Moldx All, g | Dispersant | g | Filler Loading, wt % |
|---|---|---|---|---|---|---|---|---|---|---|---|---|---|---|---|
| PEX-3 | GPM 800 | 1.30 | | | DABCO | 0.13 | A-189 | 0.14 | 0.04 | 2.33 | 1.00 | | D510 | 0.07 | 67.3% |
| PEX-4 | GPM 800 | 1.11 | | | K54 | 0.11 | | | 0.02 | 2.59 | 1.11 | | B145 | 0.08 | 74.1% |
| PEX-5 | GPM 800 | 1.35 | | | Dibutyltin Dilaurate/ DABCO | 0.07/ 0.14 | A-189 | 0.14 | 0.03 | 2.25 | 0.97 | | D510 | 0.07 | 67.6% |
| PEX-6 | GPM 800 | 1.30 | | | DABCO | 0.13 | A-189 | 0.14 | 0.04 | 2.34 | 1.00 | | D510 | 0.07 | 67.3% |
| PEX-7 | GPM 800 | 0.73 | | | DABCO LV33 | 0.07 | D1189 | 0.16 | | 2.77 | 1.19 | | B145 | 0.08 | 79.2% |
| PEX-8 | PETMP | 0.88 | GPM 800 | 0.22 | AK 54 | 0.04 | | | | | | 6.73 | B145 | 0.13 | 84.2% |
| PEX-9 | Karenz PEI | 0.33 | GPM 800 | 0.08 | | | | | | | | 2.54 | B145 | 0.05 | 84.5% |
| PEX-10 | GPM 800 | 2.72 | | | AK54 | 0.21 | | | | 14.34 | 2.39 | | B145 | 0.33 | 96.9% |
| PEX-11 | GPM 800 | 0.86 | Karenz PE1 | 0.10 | AK54 | 0.06 | | | | 5.03 | 0.84 | | B145 | 0.12 | 83.7% |
| PEX-12 | GPM 800 | 0.86 | PETMP | 0.10 | AK54 | 0.06 | | | | 5.03 | 0.84 | | B145 | 0.12 | 83.7% |
| PEX-13 | GPM 800 | 0.81 | DMDO | 0.14 | AK54 | 0.06 | | | | 5.03 | 0.84 | | B145 | 0.12 | 83.9% |
| PEX-14 | GPM 800 | 0.16 | Karenz PE1 | 0.66 | AK54 | 0.03 | | | | | | 5.05 | B145 | 0.10 | 84.2% |
| PEX-15 | GPM 800 | 3.40 | | | AK54 | 0.256 | | | | | | 20.92 | B145 | 0.42 | 83.7% |
| PEX-16 | PETMP | 3.82 | GPM 800 | 0.95 | AK54 | 0.63 | | | | | | 14.31 | B145 | 0.29 | 71.5% |
| PEX-17 | TMPTMP | 1.34 | GPM 800 | 0.33 | AK54 | 0.21 | | | | | | 5.02 | B145 | 0.10 | 71.7% |
| PEX-18 | GPM 800 | 11.1 | | | AK54 | 0.84 | | | | 32.0 | 5.33 | | B145 | 0.75 | 74.5% |
| PEX-19 | GPM 800 | 11.1 | | | AK54 | 0.84 | | | | | | 37.33 | B145 | 0.75 | 74.5% |

TABLE 4

| PREPARATIVE EXAMPLE | URETDIONE Polymerized Reaction Product | g | REACTIVE ADDITIVE | g | TM2250, g | BAK40, g | A110, g | Moldx DISPERBY K 145, g | Filler Loading, wt % | Viscosity (cP) at 25° C. Shear rate 0.10 1/s | Shear rate 0.10 1/s |
|---|---|---|---|---|---|---|---|---|---|---|---|
| PEX-20 | PEX-1 | 1.17 | | | 2.62 | 0.875 | | 0.06 | 74.0% | 1,947,880 | 1,472,060 |
| PEX-21 | PEX-1 | 8.38 | TMPTA | 0.93 | 21.58 | 3.60 | | 0.50 | 71.9% | 1,625,850 | 512,645 |
| PEX-22 | PEX-1 | 8.38 | Araldite PY 4122 | 0.93 | 21.58 | 3.60 | | 0.50 | 71.9% | 2,213,780 | 656,516 |
| PEX-23 | PEX-1 | 5.32 | Hypox UA10 | | 15.42 | 2.57 | | 0.36 | 76.0% | 2,529,670 | 989,608 |
| PEX-24 | PEX-1 | 5.32 | Hypox UA11 | | 15.42 | 2.57 | | 0.36 | 76.0% | 2,086,620 | 946,693 |
| PEX-25 | PEX-1 | 20.9 | | | | 53 | | 1.06 | 70.7% | 2,676,730 | 1,788,910 |
| PEX-26 | PEX-1 | 5.91 | EPON 828 | 1.48 | | 22.17 | | 0.44 | 73.9% | 3,021,450 | 1,388,930 |
| PEX-27 | PEX-1 | 3.96 | Araldite PY 4122 | 3.96 | | 26.54 | | 0.53 | 75.9% | | |
| PEX-28 | PEX-2 | 1.04 | Araldite PY 4122 | 1.04 | | | 4.83 | 0.1 | 69.0% | | |
| PEX-29 | PEX-2 | 0.62 | Araldite PY 4122 | 1.45 | | | 4.83 | 0.1 | 69.0% | | |
| PEX-30 | PEX-2 | 0.62 | EPON 828 | 1.45 | | | 4.83 | 0.1 | 69.0% | | |
| PEX-31 | PEX-2 | 1.04 | EPON 828 | 1.04 | | | 4.83 | 0.1 | 69.0% | | |
| PEX-32 | PEX-1 | 4.32 | Hypox UA11 | 4.32 | | | 16.04 | 0.32 | 64.2% | | |
| PEX-33 | PEX-1 | 5.61 | EGE31 | 3.02 | | | 16.04 | 0.32 | 64.2% | | |

TABLE 4-continued

| PREPARATIVE EXAMPLE | URETDIONE Polymerized Reaction Product | g | REACTIVE ADDITIVE | g | TM2250, g | BAK40, g | A110, g | Moldx DISPERBY K 145, g | Filler Loading, wt % | Viscosity (cP) at 25° C. Shear rate 0.10 1/s | Shear rate 0.10 1/s |
|---|---|---|---|---|---|---|---|---|---|---|---|
| PEX-34 | PEX-1 | 3.96 | Araldite PY 4122/ EPON 828 | 1.98/ 1.98 | 22.75 | 3.79 | | 0.53 | 75.8% | 1,972,570 | 383,794 |
| PEX-35 | PEX-1 | 1.17 | | | 2.62 | 0.88 | | 0.06 | 74.0% | 1,947,880 | 1,472,060 |
| PEX-36 | PEX-1 | 20.9 | | | | | 53 | 1.06 | 71.8% | 2,676,730 | 1,788,910 |

TABLE 5

| EXAMPLE | | | g | OLS, psi (MPa) | StDev, psi (MPa) | Tensile peak load, psi (MPa) | StDev, psi (MPa) | modulus | StDev, psi (MPa) | elongation (%) | StDev |
|---|---|---|---|---|---|---|---|---|---|---|---|
| EX-1 | Part A | PEX-3 | 2.0 | 51.8 | 26.6 | | | | | | |
| | Part B | PEX-20 | 11.3 | | | | | | | | |
| EX-2 | Part A | PEX-4 | 2.0 | 37.5 | 9.2 | | | | | | |
| | Part B | PEX-20 | 9.6 | | | | | | | | |
| EX-3 | Part A | PEX-5 | 2.0 | 54.8 | 15.5 | | | | | | |
| | Part B | PEX-20 | 11.7 | | | | | | | | |
| EX-4 | Part A | PEX-6 | 2.0 | 37.3 | 14.3 | | | | | | |
| | Part B | PEX-20 | 11.3 | | | | | | | | |
| EX-5 | Part A | PEX-5 | 2.0 | 22.7 | 5.3 | | | | | | |
| | Part B | PEX-20 | 7.7 | | | | | | | | |
| EX-6 | Part A | PEX-18 | 4.2 | 195.7 | 24.7 | | | | | | |
| | Part B | PEX-23 | 8 | | | | | | | | |
| EX-7 | Part A | PEX-18 | 4.2 | 200.6 | 53.5 | | | | | | |
| | Part B | PEX-24 | 8.0 | | | | | | | | |
| EX-8 | Part A | PEX-10 | 3 | 13.4 | 5.5 | 72.1 | 60.8 | 1682.5 | 1831.0 | 91.3 | 19.1 |
| | Part B | PEX-21 | 3.20 | | | | | | | | |
| EX-9 | Part A | PEX-10 | 3 | 34.8 | 0.4 | 472.0 | 71.8 | 5758.8 | 1055.7 | 11.4 | 0.2 |
| | Part B | PEX-22 | 5.42 | | | | | | | | |
| EX-10 | Part A | PEX-12 | 3.5 | 175.1 | 61.1 | 857.2 | 275.4 | 20928.1 | 6897.4 | 5.5 | 1.2 |
| | Part B | PEX-34 | 3.54 | | | | | | | | |
| EX-11 | Part A | PEX-13 | 3.5 | 47.3 | 9.6 | 804.3 | 108.1 | 13666.3 | 1239.9 | 8.2 | 0.6 |
| | Part B | PEX-34 | 4.10 | | | | | | | | |
| EX-12 | Part A | PEX-11 | 3.5 | 185.6 | 114.1 | 1080.6 | 156.2 | 22631.3 | 4906.8 | 6.7 | 0.6 |
| | Part B | PEX-34 | 3.47 | | | | | | | | |
| EX-13 | Part A | PEX-14 | 2.6 | 107.7 | 35.8 | 444.1 | 268.9 | 11735.3 | 6657.0 | 4.5 | 0.4 |
| | Part B | PEX-26 | 5.50 | | | | | | | | |
| EX-14 | Part A | PEX-15 | 3 | 47.3 | 9.6 | 177.0 | 22.5 | 5027.1 | 1095.7 | 4.2 | 0.8 |
| | Part B | PEX-27 | 3.6 | | | | | | | | |
| EX-15 | Part A | PEX-15 | 3.50 | 111.8 | 14.6 | 84.2 | 12.9 | 3079.7 | 1627.1 | 3.3 | 1.4 |
| | Part B | PEX-28 | 2.85 | | | | | | | | |
| EX-16 | Part A | PEX-15 | 3.50 | 136.0 | 4.7 | 141.7 | 117.5 | 3773.5 | 343.0 | 1.8 | |
| | Part B | PEX-29 | 2.49 | | | | | | | | |
| EX-17 | Part A | PEX-15 | 4.00 | 179.4 | 44.3 | 248.1 | | 5014.7 | | 5.3 | |
| | Part B | PEX-30 | 1.65 | | | | | | | | |
| EX-18 | Part A | PEX-15 | 4.00 | 226.6 | 39.0 | 353.8 | 39.9 | 16680.1 | 185.8 | | |
| | Part B | PEX-31 | 2.05 | | | | | | | | |
| EX-19 | Part A | PEX-16 | 3 | 376.1 | 105.6 | 3501.3 | 290.2 | 139123.2 | 18465.4 | 4.6 | 0.1 |
| | Part B | PEX-32 | 5.40 | | | | | | | | |
| EX-20 | Part A | PEX-17 | 3 | 294.4 | 0.2 | 1924.3 | 122.3 | 36110.9 | 1364.3 | 7.1 | 0.9 |
| | Part B | PEX-32 | 5.05 | | | | | | | | |
| EX-21 | Part A | PEX-16 | 3 | 232.6 | 14.8 | 2072.2 | 221.8 | 49931.2 | 2376.1 | 5.1 | 0.8 |
| | Part B | PEX-33 | 5.51 | | | | | | | | |
| EX-22 | Part A | PEX-17 | 3 | 149.4 | 10.9 | 1685.9 | 570.8 | 41456.0 | 9768.3 | 5.2 | 0.7 |
| | Part B | PEX-33 | 5.15 | | | | | | | | |
| EX-23 | Part A | PEX-18 | 1.0 | | | | | | | | |
| | Part B | PEX-35 | 3.93 | | | | | | | | |
| EX-24 | Part A | PEX-19 | 1.0 | | | | | | | | |
| | Part B | PEX-36 | 3.93 | | | | | | | | |

TABLE 6

| EXAMPLE | SAMPLE | FILLER | BREAKDOWN STRENGTH (kV/mm) | VOLUME RESISTIVITY (Ohm-cm) | THERMAL CONDUCTIVITY (W/mK) |
|---|---|---|---|---|---|
| EX-25 | EX-23 | Alumina | 16.79 | 8.82E+09 | 1.735 |
| EX-26 | EX-24 | ATH | 18.49 | 7.32E+09 | 1.255 |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A two-part composition comprising:
   1) a first part comprising a polymeric material comprising:
      a) a polymerized reaction product of a polymerizable composition comprising components, the components comprising:
         i) a uretdione-containing material comprising a reaction product of a diisocyanate reacted with itself;
         ii) a first hydroxyl-containing compound having more than one OH group; and
         iii) an optional second hydroxyl-containing compound having a single OH group, wherein the second hydroxyl-containing compound is a primary alcohol or a secondary alcohol; and
      b) 40% by weight or greater of an inorganic filler, based on the total weight of the polymeric material;
      wherein the polymerized reaction product comprises a uretdione functionality of 1.3 to 2.5 and wherein the polymerized reaction product has a number average molecular weight (Mn) of 1100 grams per mole (g/mol) or greater; and
   2) a second part comprising:
      a) a polythiol having an average sulfhydryl group functionality of 2 or greater; and
      b) 40% by weight or greater of an inorganic filler, based on the total weight of the second part.

2. The two-part composition of claim 1, wherein the inorganic filler of the first part, the second part, or both, comprises at least one of aluminum oxide, boron nitride, silicon dioxide, alumina trihydrate (ATH), aluminum nitride, silicon carbide, beryllium oxide, zinc oxide, carbon nanotubes, graphene, graphite, aluminum, or copper.

3. The two-part composition of claim 1, wherein the inorganic filler of the first part is present in an amount of 45% by weight to 95% by weight, based on the total weight of the polymeric material.

4. The two-part composition of claim 1, wherein the inorganic filler of the first part is present in an amount of 30% by volume to 70% by volume, based on the total volume of the polymeric material.

5. The two-part composition of claim 1, wherein the polythiol comprises a primary thiol.

6. The two-part composition of claim 1, wherein the polythiol comprises a secondary thiol.

7. The two-part composition of claim 1, wherein the first hydroxyl-containing compound is an alkylene polyol, a polyester polyol, or a polyether polyol.

8. The two-part composition of claim 1, wherein the first hydroxyl-containing compound is of Formula II:

wherein $R_2$ is selected from $R_3$, an alkylene, and an alkylene substituted with an OH group, wherein $R_3$ is of Formula III or Formula IV:

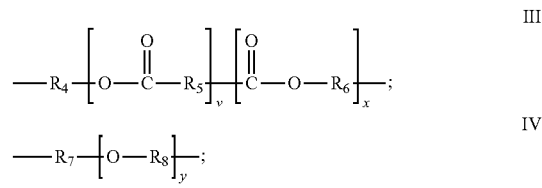

wherein each of $R_4$, $R_5$, $R_6$, $R_7$, and $R_8$ is independently an alkylene, wherein each of v and y is independently 1 to 40, and wherein x is selected from 0 to 40.

9. The two-part composition of claim 1, wherein the first hydroxyl-containing compound is a polypropylene glycol polyol or a polytetramethylene ether glycol.

10. The two-part composition of claim 9, wherein the first hydroxyl-containing compound has a number average molecular weight of 500 to 4,000 g/mol.

11. The two-part composition of claim 1, wherein the polymeric material further comprises at least one epoxy component.

12. The two-part composition of claim 1, wherein the polymeric material further comprises at least one acrylate component.

13. The two-part composition of claim 1, wherein the polymeric material exhibits a viscosity of 10,000 centiPoise (cP) to 11,000,000 cP, as determined using a parallel-plate geometry using steady flow mode and a shear rate of 1 1/s at 25° C.

14. A polymerized product of the two-part composition of claim 1.

15. The polymerized product of claim 14, exhibiting at least one of an overlap shear to aluminum of 1 MPa or greater at 140° C., a thermal conductivity of 0.5 W/m*K or greater, a tensile peak load of 0.25 or greater, a modulus of 500 MPa or less, or an elongation percent of 5 or greater.

16. A battery module comprising a plurality of battery cells connected to a base plate by a layer of the polymerized product of claim 14.

17. A method of adhering two substrates together comprising:
A) obtaining a two-part composition, the two-part composition comprising:
1) a first part comprising a polymeric material comprising:
   a) a polymerized reaction product of a polymerizable composition comprising components, the components comprising:
      i) a uretdione-containing material comprising a reaction product of a diisocyanate reacted with itself;
      ii) a first hydroxyl-containing compound having more than one OH group; and
      iii) an optional second hydroxyl-containing compound having a single OH group, wherein the second hydroxyl-containing compound is a primary alcohol or a secondary alcohol; and
   b) 40% by weight or greater of an inorganic filler, based on the total weight of the polymeric material;
   wherein the polymerized reaction product comprises a uretdione functionality of 1.3 to 2.5 and wherein the polymerized reaction product has a number average molecular weight (Mn) of 1100 grams per mole (g/mol) or greater; and
2) a second part comprising:
   a) a polythiol having an average sulfhydryl group functionality of 2 or greater; and
   b) 40% by weight or greater of an inorganic filler, based on the total weight of the second part;
B) combining at least a portion of the first part with at least a portion of the second part to form a mixture;
C) disposing at least a portion of the mixture on a first major surface of a first substrate; and
D) contacting a first major surface of a second substrate with the mixture disposed on the first substrate.

* * * * *